United States Patent
Karczewicz et al.

(10) Patent No.: US 6,950,469 B2
(45) Date of Patent: Sep. 27, 2005

(54) METHOD FOR SUB-PIXEL VALUE INTERPOLATION

(75) Inventors: Marta Karczewicz, Irving, TX (US); Antti Olli Hallapuro, Tampere (FI)

(73) Assignee: Nokia Corporation, Espoo (FI)

( * ) Notice: Subject to any disclaimer, the term of this patent is extended or adjusted under 35 U.S.C. 154(b) by 688 days.

(21) Appl. No.: 09/954,608

(22) Filed: Sep. 17, 2001

(65) Prior Publication Data

US 2003/0112864 A1 Jun. 19, 2003

(51) Int. Cl.[7] ............................................. H04N 7/12
(52) U.S. Cl. .............................................. 375/240.17
(58) Field of Search ..................... 375/240.17, 240.16; 382/236

(56) References Cited

U.S. PATENT DOCUMENTS

| | | | | |
|---|---|---|---|---|
| 4,816,913 A | * | 3/1989 | Harney et al. | 375/240.08 |
| 5,485,279 A | * | 1/1996 | Yonemitsu et al. | 375/240.14 |
| 5,521,642 A | | 5/1996 | Park | 348/409 |
| 5,568,597 A | | 10/1996 | Nakayama et al. | 395/132 |
| 5,570,436 A | | 10/1996 | Fukushima et al. | 382/300 |
| 5,594,813 A | * | 1/1997 | Fandrianto et al. | 382/236 |
| 5,754,240 A | * | 5/1998 | Wilson | 375/240.15 |
| 5,852,468 A | * | 12/1998 | Okada | 348/272 |
| 5,901,248 A | | 5/1999 | Fandrianto et al. | 382/236 |
| 6,104,753 A | * | 8/2000 | Kim et al. | 375/240.16 |
| 6,219,464 B1 | | 4/2001 | Greggain et al. | 382/298 |
| 6,252,576 B1 | | 6/2001 | Nottingham | 345/127 |
| 6,381,279 B1 | * | 4/2002 | Taubman | 375/240.18 |
| 6,714,593 B1 | * | 3/2004 | Benzler et al. | 375/240.16 |
| 2002/0064229 A1 | | 5/2002 | Nakaya | 375/240.17 |

FOREIGN PATENT DOCUMENTS

| | | |
|---|---|---|
| EP | 0573290 A2 | 12/1993 |
| GB | 2205707 | 12/1988 |

OTHER PUBLICATIONS

Lappalainen, Ville, Performance analysis of Intel MMX technology for an H.263 video H.263 video encoder, 1998, ACM Press, pp. 309–314.*

* cited by examiner

Primary Examiner—Chris Kelley
Assistant Examiner—Matthew Haney
(74) Attorney, Agent, or Firm—Perman & Green, LLP

(57) ABSTRACT

A method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the method comprising:

a) when values for sub-pixels at half unit horizontal and unit vertical locations, and unit horizontal and half unit vertical locations are required, interpolating such values directly using weighted sums of pixels residing at unit horizontal and unit vertical locations;

b) when values for sub-pixels at half unit horizontal and half unit vertical locations are required, interpolating such values directly using a weighted sum of values for sub-pixels residing at half unit horizontal and unit vertical locations calculated according to step (a); and c) when values for sub-pixels at quarter unit horizontal and quarter unit vertical locations are required, interpolating such values by taking the average of at least one pair of a first pair of values of a sub-pixel located at a half unit horizontal and unit vertical location, and a sub-pixel located at a unit horizontal and half unit vertical location and a second pair of values of a pixel located at a unit horizontal and unit vertical location, and a sub-pixel located at a half unit horizontal and half unit vertical location.

51 Claims, 26 Drawing Sheets

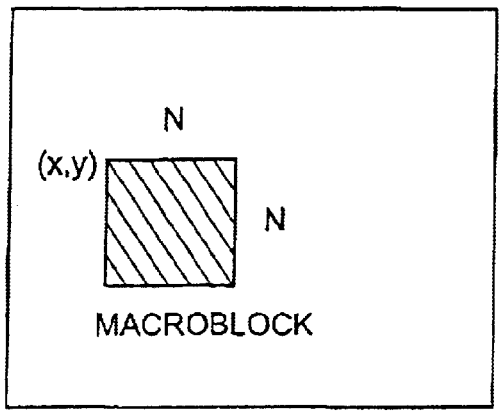
a)
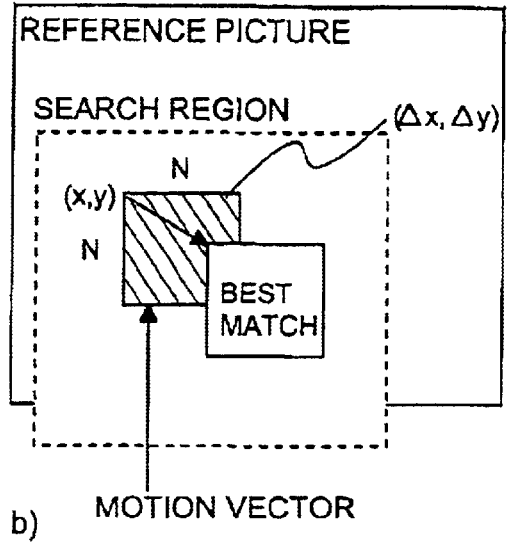
b)
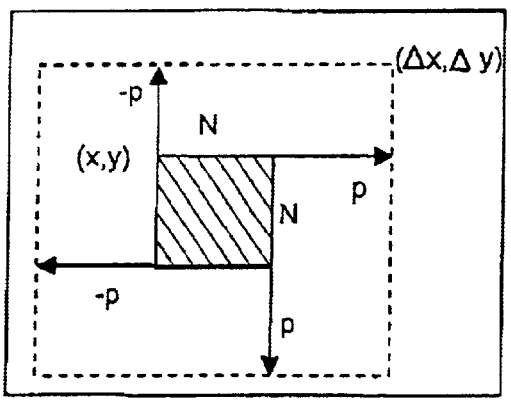
c) [-p,p] SEARCH REGION
Fig. 4

| | | | | |
|---|---|---|---|---|
| A | d | b | d | A |
| e | e | e | e | |
| c | d | c | d | |
| e | e | e | f | |
| A | | | | A |

|   |   |   |   |
|---|---|---|---|
| e | e | e | e |
| e | d | c | d |
| e | e | e | f |
| e | c | e |   |

| | | | | |
|---|---|---|---|---|
| A | d | b | d | A |
| e | g | e | g | |
| c | d | c | d | |
| e | g | e | f | |
| A | | | | A |

| | | | | |
|---|---|---|---|---|
| A | d | b | d | A |
| e | h | f | h | |
| b | g | c | g | |
| e | h | f | i | |
| A | | | | A |

| 1 | 2 | 3 | 4 |
|---|---|---|---|
| 5 | 6 | 7 | 8 |
| 9 | 10 | 11 | 12 |
| 13 | 14 | 15 | 16 |

Fig. 19

|   | A |   |   |   |   |   |   |   |
|---|---|---|---|---|---|---|---|---|
| d | e | d | f | d | e | d | e |   |
| $b^3$ | d | $c^{13}$ | d | $c^{23}$ | d | $c^{33}$ | d |   |
| d | f | d | g | d | g | d | f |   |
| $b^2$ | d | $c^{12}$ | d | $c^{22}$ | d | $c^{32}$ | d |   |
| d | f | d | g | d | g | d | f |   |
| $b^1$ | d | $c^{11}$ | d | $c^{21}$ | d | $c^{31}$ | d |   |
| d | e | d | f | d | f | d | e |   |
| A | d | $b^1$ | d | $b^2$ | d | $b^3$ | d | A |

Figure 20

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

Fig. 22

METHOD FOR SUB-PIXEL VALUE INTERPOLATION

The present invention relates to a method for sub-pixel value interpolation in the encoding and decoding of data. It relates particularly, but not exclusively, to encoding and decoding of digital video.

BACKGROUND OF THE INVENTION

Digital video sequences, like ordinary motion pictures recorded on film, comprise a sequence of still images, the illusion of motion being created by displaying the images one after the other at a relatively fast frame rate, typically 15 to 30 frames per second. Because of the relatively fast frame rate, images in consecutive frames tend to be quite similar and thus contain a considerable amount of redundant information. For example, a typical scene may comprise some stationary elements, such as background scenery, and some moving areas, which may take many different forms, for example the face of a newsreader, moving traffic and so on. Alternatively, the camera recording the scene may itself be moving, in which case all elements of the image have the same kind of motion. In many cases, this means that the overall change between one video frame and the next is rather small. Of course, this depends on the nature of the movement. For example, the faster the movement, the greater the change from one frame to the next. Similarly, if a scene contains a number of moving elements, the change from one frame to the next is likely to be greater than in a scene where only one element is moving.

It should be appreciated that each frame of a raw, that is uncompressed, digital video sequence comprises a very large amount of image information. Each frame of an uncompressed digital video sequence is formed from an array of image pixels. For example, in a commonly used digital video format, known as the Quarter Common Interchange Format (QCIF), a frame comprises an array of 176×144 pixels, in which case each frame has 25,344 pixels. In turn, each pixel is represented by a certain number of bits, which carry information about the luminance and/or colour content of the region of the image corresponding to the pixel. Commonly, a so-called YUV colour model is used to represent the luminance and chrominance content of the image. The luminance, or Y, component represents the intensity (brightness) of the image, while the colour content of the image is represented by two chrominance components, labelled U and V.

Colour models based on a luminance/chrominance representation of image content provide certain advantages compared with colour models that are based on a representation involving primary colours (that is Red, Green and Blue, RGB). The human visual system is more sensitive to intensity variations than it is to colour variations; YUV colour models exploit this property by using a lower spatial resolution for the chrominance components (U, V) than for the luminance component (Y). In this way the amount of information needed to code the colour information in an image can be reduced with an acceptable reduction in image quality.

The lower spatial resolution of the chrominance components is usually attained by sub-sampling. Typically, a block of 16×16 image pixels is represented by one block of 16×16 pixels comprising luminance information and the corresponding chrominance components are each represented by one block of 8×8 pixels representing an area of the image equivalent to that of the 16×16 pixels of the luminance component. The chrominance components are thus spatially sub-sampled by a factor of 2 in the x and y directions. The resulting assembly of one 16×16 pixel luminance block and two 8×8 pixel chrominance blocks is commonly referred to as a YUV macroblock, or macroblock, for short.

A QCIF image comprises 11×9 macroblocks. If the luminance blocks and chrominance blocks are represented with 8 bit resolution (that is by numbers in the range 0 to 255), the total number of bits required per macroblock is (16×16×8)+2×(8×8×8)=3072 bits. The number of bits needed to represent a video frame in QCIF format is thus 99×3072=304,128 bits. This means that the amount of data required to transmit/record/display a video sequence in QCIF format, represented using a YUV colour model, at a rate of 30 frames per second, is more than 9 Mbps (million bits per second). This is an extremely high data rate and is impractical for use in video recording, transmission and display applications because of the very large storage capacity, transmission channel capacity and hardware performance required.

If video data is to be transmitted in real-time over a fixed line network such as an ISDN (Integrated Services Digital Network) or a conventional PSTN (Public Service Telephone Network), the available data transmission bandwidth is typically of the order of 64 kbits/s. In mobile videotelephony, where transmission takes place at least in part over a radio communications link, the available bandwidth can be as low as 20 kbits/s. This means that a significant reduction in the amount of information used to represent video data must be achieved in order to enable transmission of digital video sequences over low bandwidth communication networks. For this reason video compression techniques have been developed which reduce the amount of information transmitted while retaining an acceptable image quality.

Video compression methods are based on reducing the redundant and perceptually irrelevant parts of video sequences. The redundancy in video sequences can be categorised into spatial, temporal and spectral redundancy. 'Spatial redundancy' is the term used to describe the correlation between neighbouring pixels within a frame. The term 'temporal redundancy' expresses the fact that the objects appearing in one frame of a sequence are likely to appear in subsequent frames, while 'spectral redundancy' refers to the correlation between different colour components of the same image.

Sufficiently efficient compression cannot usually be achieved by simply reducing the various forms of redundancy in a given sequence of images. Thus, most current video encoders also reduce the quality of those parts of the video sequence which are subjectively the least important. In addition, the redundancy of the compressed video bitstream is itself reduced by means of efficient loss-less encoding. Typically, this is achieved using a technique known as 'variable length coding' (VLC).

Modern video compression standards, such as ITU-T recommendations H.261, H.263(+)(++), H.26L and the Motion Picture Experts Group recommendation MPEG-4 make use of 'motion compensated temporal prediction'. This is a form of temporal redundancy reduction in which the content of some (often many) frames in a video sequence is 'predicted' from other frames in the sequence by tracing the motion of objects or regions of an image between frames.

Compressed images which do not make use of temporal redundancy reduction are usually called INTRA-coded or I-frames, whereas temporally predicted images are called INTER-coded or P-frames. In the case of INTER frames, the predicted (motion-compensated) image is rarely precise enough to represent the image content with sufficient quality, and therefore a spatially compressed prediction error (PE) frame is also associated with each INTER frame. Many video compression schemes can also make use of bi-directionally predicted frames, which are commonly referred to as B-pictures or B-frames. B-pictures are inserted between reference or so-called 'anchor' picture pairs (I or P frames) and are predicted from either one or both of the anchor pictures. B-pictures are not themselves used as anchor pictures, that is no other frames are predicted from them, and therefore, they can be discarded from the video sequence without causing deterioration in the quality of future pictures.

The different types of frame that occur in a typical compressed video sequence are illustrated in FIG. 3 of the accompanying drawings. As can be seen from the figure, the sequence starts with an INTRA or I frame 30. In FIG. 3, arrows 33 denote the 'forward' prediction process by which P-frames (labelled 34) are formed. The bidirectional prediction process by which B-frames (36) are formed is denoted by arrows 31a and 31b, respectively.

A schematic diagram of an example video coding system using motion compensated prediction is shown in FIGS. 1 and 2. FIG. 1 illustrates an encoder 10 employing motion compensation and FIG. 2 illustrates a corresponding decoder 20. The encoder 10 shown in FIG. 1 comprises a Motion Field Estimation block 11, a Motion Field Coding block 12, a Motion Compensated Prediction block 13, a Prediction Error Coding block 14, a Prediction Error Decoding block 15, a Multiplexing block 16, a Frame Memory 17, and an adder 19. The decoder 20 comprises a Motion Compensated Prediction block 21, a Prediction Error Decoding block 22, a Demultiplexing block 23 and a Frame Memory 24.

The operating principle of video coders using motion compensation is to minimise the amount of information in a prediction error frame $E_n(x,y)$, which is the difference between a current frame $I_n(x,y)$ being coded and a prediction frame $P_n(x,y)$. The prediction error frame is thus:

$$E_n(x,y)=I_n(x,y)-P_n(x,y). \quad (1)$$

The prediction frame $P_n(x,y)$ is built using pixel values of a reference frame $R_n(x,y)$, which is generally one of the previously coded and transmitted frames, for example the frame immediately preceding the current frame and is available from the Frame Memory 17 of the encoder 10. More specifically, the prediction frame $P_n(x,y)$ is constructed by finding so-called 'prediction pixels' in the reference frame $R_n(x,y)$ which correspond substantially with pixels in the current frame. Motion information, describing the relationship (e.g. relative location, rotation, scale etc.) between pixels in the current frame and their corresponding prediction pixels in the reference frame is derived and the prediction frame is constructed by moving the prediction pixels according to the motion information. In this way, the prediction frame is constructed as an approximate representation of the current frame, using pixel values in the reference frame. The prediction error frame referred to above therefore represents the difference between the approximate representation of the current frame provided by the prediction frame and the current frame itself. The basic advantage provided by video encoders that use motion compensated prediction arises from the fact that a comparatively compact description of the current frame can be obtained by representing it in terms of the motion information required to form its prediction together with the associated prediction error information in the prediction error frame.

However, due to the very large number of pixels in a frame, it is generally not efficient to transmit separate motion information for each pixel to the decoder. Instead, in most video coding schemes, the current frame is divided into larger image segments $S_k$ and motion information relating to the segments is transmitted to the decoder. For example, motion information is typically provided for each macroblock of a frame and the same motion information is then used for all pixels within the macroblock. In some video coding standards, such as H.26L, a macroblock can be divided into smaller blocks, each smaller block being provided with its own motion information.

The motion information usually takes the form of motion vectors $[\Delta x(x,y),\Delta y(x,y)]$. The pair of numbers $\Delta x(x,y)$ and $\Delta y(x,y)$ represents the horizontal and vertical displacements of a pixel at location (x,y) in the current frame $I_n(x,y)$ with respect to a pixel in the reference frame $R_n(x,y)$. The motion vectors $[\Delta x(x,y),\Delta y(x,y)]$ are calculated in the Motion Field Estimation block 11 and the set of motion vectors of the current frame $[\Delta x(\bullet),\Delta y(\bullet)]$ is referred to as the motion vector field.

Typically, the location of a macroblock in a current video frame is specified by the (x,y) co-ordinate of its upper left-hand corner. Thus, in a video coding scheme in which motion information is associated with each macroblock of a frame, each motion vector describes the horizontal and vertical displacement $\Delta x(x,y)$ and $\Delta y(x,y)$ of a pixel representing the upper left-hand corner of a macroblock in the current frame $I_n(x,y)$ with respect to a pixel in the upper left-hand corner of a substantially corresponding block of prediction pixels in the reference frame $R_n(x,y)$ (as shown in FIG. 4b).

Motion estimation is a computationally intensive task. Given a reference frame $R_n(x,y)$ and, for example, a square macroblock comprising N×N pixels in a current frame (as shown in FIG. 4a), the objective of motion estimation is to find an N×N pixel block in the reference frame that matches the characteristics of the macroblock in the current picture according to some criterion. This criterion can be, for example, a sum of absolute differences (SAD) between the pixels of the macroblock in the current frame and the block of pixels in the reference frame with which it is compared. This process is known generally as 'block matching'. It should be noted that, in general, the geometry of the block to be matched and that in the reference frame do not have to be the same, as real-world objects can undergo scale changes, as well as rotation and warping. However, in current international video coding standards, only a translational motion model is used (see below) and thus fixed rectangular geometry is sufficient.

Ideally, in order to achieve the best chance of finding a match, the whole of the reference frame should be searched. However, this is impractical as it imposes too high a computational burden on the video encoder. Instead, the search region is restricted to region [−p,p] around the original location of the macroblock in the current frame, as shown in FIG. 4c.

In order to reduce the amount of motion information to be transmitted from the encoder 10 to the decoder 20, the motion vector field is coded in the Motion Field Coding block 12 of the encoder 10, by representing it with a motion model. In this process, the motion vectors of image segments are re-expressed using certain predetermined functions or, in other words, the motion vector field is represented with a model. Almost all currently used motion vector field models are additive motion models, complying with the following general formula:

$$\Delta x(x, y) = \sum_{i=0}^{N-1} a_i f_i(x, y) \quad (2)$$

$$\Delta y(x, y) = \sum_{i=0}^{M-1} b_i g_i(x, y) \quad (3)$$

where coefficients $a_i$ and $b_i$ are called motion coefficients. The motion coefficients are transmitted to the decoder 20 (information stream 2 in FIGS. 1 and 2). Functions $f_i$ and $g_i$ are called motion field basis functions, and are known both to the encoder and decoder. An approximate motion vector field $(\Delta x(x,y),\Delta y(x,y))$ can be constructed using the coefficients and the basis functions. As the basis functions are known to (that is stored in) both the encoder 10 and the decoder 20, only the motion coefficients need to be transmitted to the encoder, thus reducing the amount of information required to represent the motion information of the frame.

The simplest motion model is the translational motion model which requires only two coefficients to describe the motion vectors of each segment. The values of motion vectors are given by:

$$\Delta x(x,y) = a_0$$

$$\Delta y(x,y) = b_0 \quad (4)$$

This model is widely used in various international standards (ISO MPEG-1, MPEG-2, MPEG-4, ITU-T Recommendations H.261 and H.263) to describe the motion of 16×16 and 8×8 pixel blocks. Systems which use a translational motion model typically perform motion estimation at full pixel resolution or some integer fraction of full pixel resolution, for example at half or one quarter pixel resolution.

The prediction frame $P_n(x,y)$ is constructed in the Motion Compensated Prediction block 13 in the encoder 10, and is given by:

$$P_n(x,y) = R_n[x + \tilde{\Delta}x(x,y), y + \tilde{\Delta}y(x,y)] \quad (5)$$

In the Prediction Error Coding block 14, the prediction error frame $E_n(x,y)$ is typically compressed by representing it as a finite series (transform) of some 2-dimensional functions. For example, a 2-dimensional Discrete Cosine Transform (DCT) can be used. The transform coefficients are quantised and entropy (for example Huffman) coded before they are transmitted to the decoder (information stream 1 in FIGS. 1 and 2). Because of the error introduced by quantisation, this operation usually produces some degradation (loss of information) in the prediction error frame $E_n(x,y)$. To compensate for this degradation, the encoder 10 also comprises a Prediction Error Decoding block 15, where a decoded prediction error frame $\tilde{E}_n(x,y)$ is constructed using the transform coefficients. This locally decoded prediction error frame is added to the prediction frame $P_n(x,y)$ in the adder 19 and the resulting decoded current frame $\tilde{I}_n(x,y)$ is stored in the Frame Memory 17 for further use as the next reference frame $R_{n+1}(x,y)$.

The information stream 2 carrying information about the motion vectors is combined with information about the prediction error in multiplexer 16 and an information stream 3 containing typically at least those two types of information is sent to the decoder 20.

The operation of a corresponding video decoder 20 will now be described.

The Frame Memory 24 of the decoder 20 stores a previously reconstructed reference frame $R_n(x,y)$. The prediction frame $P_n(x,y)$ is constructed in the Motion Compensated Prediction block 21 of the decoder 20 according to equation 5, using received motion coefficient information and pixel values of the previously reconstructed reference frame $R_n(x,y)$. The transmitted transform coefficients of the prediction error frame $E_n(x,y)$ are used in the Prediction Error Decoding block 22 to construct the decoded prediction error frame $\tilde{E}_n(x,y)$. The pixels of the decoded current frame $\tilde{I}_n(x,y)$ are then reconstructed by adding the prediction frame $P_n(x,y)$ and the decoded prediction error frame $\tilde{E}_n(x,y)$:

$$\tilde{I}_n(x,y) = P_n(x,y) + \tilde{E}_n(x,y) = R_n[x + \tilde{\Delta}x(x,y), y + \tilde{\Delta}y(x,y)] + \tilde{E}_n(x,y). \quad (6)$$

This decoded current frame may be stored in the Frame Memory 24 as the next reference frame $R_{n+1}(x,y)$.

In the description of motion compensated encoding and decoding of digital video presented above, the motion vector $[\Delta x(x,y), \Delta y(x,y)]$ describing the motion of a macroblock in the current frame with respect to the reference frame $R_n(x,y)$ can point to any of the pixels in the reference frame. This means that motion between frames of a digital video sequence can only be represented at a resolution which is determined by the image pixels in the frame (so-called full pixel resolution). Real motion, however, has arbitrary precision, and thus the system described above can only provide approximate modelling of the motion between successive frames of a digital video sequence. Typically, modelling of motion between video frames with full pixel resolution is not sufficiently accurate to allow efficient minimisation of the prediction error (PE) information associated with each macroblock/frame. Therefore, to enable more accurate modelling of real motion and to help reduce the amount of PE information that must be transmitted from encoder to decoder, many video coding standards, such as H.263(+)(++) and H.26L, allow motion vectors to point 'in between' image pixels. In other words, the motion vectors can have 'sub-pixel' resolution. Allowing motion vectors to have sub-pixel resolution adds to the complexity of the encoding and decoding operations that must be performed, so it is still advantageous to limit the degree of spatial resolution a motion vector may have. Thus, video coding standards, such as those previously mentioned, typically only allow motion vectors to have full-, half- or quarter-pixel resolution.

Motion estimation with sub-pixel resolution is usually performed as a two-stage process, as illustrated in FIG. 5, for a video coding scheme which allows motion vectors to have full- or half-pixel resolution. In the first step, a motion vector having full-pixel resolution is determined using any appropriate motion estimation scheme, such as the block-matching process described in the foregoing. The resulting motion vector, having full-pixel resolution is shown in FIG. 5.

In the second stage, the motion vector determined in the first stage is refined to obtain the desired half-pixel resolution. In the example illustrated in FIG. 5, this is done by forming eight new search blocks of 16×16 pixels, the location of the top-left corner of each block being marked with an X in FIG. 5. These locations are denoted as $[\Delta x + m/2, \Delta y + n/2]$, where m and n can take the values −1, 0 and +1, but cannot be zero at the same time. As only the pixel values of original image pixels are known, the values (for example luminance and/or chrominance values) of the sub-pixels residing at half-pixel locations must be estimated for each of the eight new search blocks, using some form of interpolation scheme.

Having interpolated the values of the sub-pixels at half-pixel resolution, each of the eight search blocks is compared with the macroblock whose motion vector is being sought. As in the block matching process performed in order to determine the motion vector with full pixel resolution, the macroblock is compared with each of the eight search blocks according to some criterion, for example a SAD. As a result of the comparisons, a minimum SAD value will generally be obtained. Depending on the nature of the motion in the video sequence, this minimum value may correspond to the location specified by the original motion vector (having full-pixel resolution), or it may correspond to a location having a half-pixel resolution. Thus, it is possible to determine whether a motion vector should point to a full-pixel or sub-pixel location and if sub-pixel resolution is appropriate, to determine the correct sub-pixel resolution motion vector. It should also be appreciated that the scheme just described can be extended to other sub-pixel resolutions (for example, one-quarter-pixel resolution) in an entirely analogous fashion.

In practice, the estimation of a sub-pixel value in the reference frame is performed by interpolating the value of the sub-pixel from surrounding pixel values. In general, interpolation of a sub-pixel value $F(x,y)$ situated at a non-integer location $(x, y)=(n+\Delta x, m+\Delta y)$, can be formulated as a two-dimensional operation, represented mathematically as:

$$F(x, y) = \sum_{k=-K}^{K=1} \sum_{l=-L}^{L=1} f(k+K, l+L) F(n+k, m+l) \quad (7)$$

where f(k,l) are filter coefficients and n and m are obtained by truncating x and y, respectively, to integer values. Typically, the filter coefficients are dependent on the x and y values and the interpolation filters are usually so-called 'separable filters', in which case sub-pixel value $F(x,y)$ can be calculated as follows:

$$F(x, y) = \sum_{k=-K}^{K=1} f(k+K) \sum_{l=-K}^{K=1} f(l+K) F(n+k, m+l) \quad (8)$$

The motion vectors are calculated in the encoder. Once the corresponding motion coefficients are transmitted to the decoder, it is a straightforward matter to interpolate the required sub-pixels using an interpolation method identical to that used in the encoder. In this way, a frame following a reference frame in the Frame Memory 24, can be reconstructed from the reference frame and the motion vectors.

The simplest way of applying sub-pixel value interpolation in a video coder is to interpolate each sub-pixel value every time it is needed. However, this is not an efficient solution in a video encoder, because it is likely that the same sub-pixel value will be required several times and thus calculations to interpolate the same sub-pixel value will be performed multiple times. This results in an unnecessary increase of computational complexity/burden in the encoder.

An alternative approach, which limits the complexity of the encoder, is to pre-calculate and store all sub-pixel values in a memory associated with the encoder. This solution is called interpolation 'before-hand' interpolation hereafter in this document. While limiting complexity, before-hand interpolation has the disadvantage of increasing memory usage by a large margin. For example, if the motion vector accuracy is one quarter pixel in both horizontal and vertical dimensions, storing pre-calculated sub-pixel values for a complete image results in a memory usage that is 16 times that required to store the original, non-interpolated image. In addition, it involves the calculation of some sub-pixels which might not actually be required in calculating motion vectors in the encoder. Before-hand interpolation is also particularly inefficient in a video decoder, as the majority of pre-calculated sub-pixel values will never be required by the decoder. Thus, it is advantageous not to use pre-calculation in the decoder.

So-called 'on-demand' interpolation can be used to reduce memory requirements in the encoder. For example, if the desired pixel precision is quarter pixel resolution, only sub-pixels at one half unit resolution are interpolated beforehand for the whole frame and stored in the memory. Values of one-quarter pixel resolution sub-pixels are only calculated during the motion estimation/compensation process as and when it is required. In this case memory usage is only 4 times that required to store the original, non-interpolated image.

It should be noted that when before-hand interpolation is used, the interpolation process constitutes only a small fraction of the total encoder computational complexity/burden, since every pixel is interpolated just once. Therefore, in the encoder, the complexity of the interpolation process itself is not very critical when before-hand sub-pixel value interpolation is used. On the other hand, on-demand interpolation poses a much higher computational burden on the encoder, since sub-pixels may be interpolated many times. Hence the complexity of interpolation process, which may be considered in terms of the number of computational operations or operational cycles that must be performed in order to interpolate the sub-pixel values, becomes an important consideration.

In the decoder, the same sub-pixel values are used a few times at most and some are not needed at all. Therefore, in the decoder it is advantageous not to use before-hand interpolation at all, that is, it is advantageous not to pre-calculate any sub-pixel values.

Two interpolation schemes have been developed as part of the work ongoing in the ITU-Telecommunications Standardization Sector, Study Group 16, Video Coding Experts Group (VCEG), Questions 6 and 15. These approaches were proposed for incorporation into ITU-T recommendation H.26L and have been implemented in test models (TML) for the purposes of evaluation and further development. The test model corresponding to Question 15 is referred to as Test Model 5 (TML5), while that resulting from Question 6 is known as Test Model 6 (TML6). The interpolation schemes proposed in both TML5 and TML6 will now be described.

Throughout the description of the sub-pixel value interpolation scheme used in test model TML5, reference will be made to FIG. 12*a*, which defines a notation for describing pixel and sub-pixel locations specific to TML5. A separate notation, defined in FIG. 13*a*, will be used in the discussion of the sub-pixel value interpolation scheme used in TML6. A still further notation, illustrated in FIG. 14*a*, will be used later in the text in connection with the sub-pixel value interpolation method according to the invention. It should be appreciated that the three different notations used in the text are intended to assist in the understanding of each interpolation method and to help distinguish differences between them. However, in all three figures, the letter A is used to denote original image pixels (full pixel resolution). More specifically, the letter A represents the location of pixels in the image data representing a frame of a video sequence, the pixel values of pixels A being either received as current frame $I_n(x,y)$ from a video source, or reconstructed and stored as a reference frame $R_n(x,y)$ in the Frame Memory 17, 24 of the encoder 10 or the decoder 20. All other letters represent sub-pixel locations, the values of the sub-pixels situated at the sub-pixel locations being obtained by interpolation.

Certain other terms will also be used in a consistent manner throughout the text to identify particular pixel and sub-pixel locations. These are as follows:

The term 'unit horizontal location' is used to describe the location of any sub-pixel that is constructed in a column of the original image data. Sub-pixels c and e in FIGS. 12a and 13a, as well as sub-pixels b and e in FIG. 14a have unit horizontal locations.

The term 'unit vertical location' is used to describe any sub-pixel that is constructed in a row of the original image data. Sub-pixels b and d in FIGS. 12a and 13a as well as sub-pixels b and d in FIG. 14a have unit vertical locations.

By definition, pixels A have unit horizontal and unit vertical locations.

The term 'half horizontal location' is used to describe the location of any sub-pixel that is constructed in a column that lies at half pixel resolution. Sub-pixels b, c, and e shown in FIGS. 12a and 13a fall into this category, as do sub-pixels b, c and f in FIG. 14a. In a similar manner, the term 'half vertical location' is used to describe the location of any sub-pixel that is constructed in a row that lies at half-pixel resolution, such as sub-pixels c and d in FIGS. 12a and 13a, as well as sub-pixels b, c and g in FIG. 14a.

Furthermore, the term 'quarter horizontal location' refers to any sub-pixel that is constructed in a column which lies at quarter-pixel resolution, such as sub-pixels d and e in FIG. 12a, sub-pixels d and g in FIG. 13a and sub-pixels d, g and h in FIG. 14a. Analogously, the term 'quarter vertical location' refers to sub-pixels that are constructed in a row which lies at quarter-pixel resolution. In FIG. 12a, sub-pixels e and f fall into this category, as do sub-pixels e, f and g in FIG. 13a and sub-pixels e, f and h in FIG. 14a.

The definition of each of the terms described above is shown by 'envelopes' drawn on the corresponding figures.

It should further be noted that it is often convenient to denote a particular pixel with a two-dimensional reference. In this case, the appropriate two-dimensional reference can be obtained by examining the intersection of the envelopes in FIGS. 12a, 13a and 14a. Applying this principle, pixel d in FIG. 12a, for example, has a half horizontal and half vertical location and sub-pixel e has a unit horizontal and quarter vertical location. In addition, and for ease of reference, sub-pixels that reside at half unit horizontal and unit vertical locations, unit horizontal and half unit vertical locations as well as half unit horizontal and half unit vertical locations, will be referred to as ½ resolution sub-pixels. Sub-pixels which reside at any quarter unit horizontal and/or quarter unit vertical location will be referred to as ¼ resolution sub-pixels.

It should also be noted that in the descriptions of the two test models and in the detailed description of the invention itself, it will be assumed that pixels have a minimum value of 0 and a maximum value of $2^n-1$ where n is the number of bits reserved for a pixel value. The number of bits is typically 8. After a sub-pixel has been interpolated, if the value of that interpolated sub-pixel exceeds the value of $2^n-1$, it is restricted to the range of $[0, 2^n-1]$, i.e. values lower than the minimum allowed value will become the minimum value (0) and values larger than the maximum will the become maximum value ($2^n-1$). This operation is called clipping.

The sub-pixel value interpolation scheme according to TML5 will now be described in detail with reference to FIGS. 12a, 12b and 12c.

1. The value for the sub-pixel at half unit horizontal and unit vertical location, that is ½ resolution sub-pixel b in FIG. 12a, is calculated using a 6-tap filter. The filter interpolates a value for ½ resolution sub-pixel b based upon the values of the 6 pixels ($A_1$ to $A_6$) situated in a row at unit horizontal locations and unit vertical locations symmetrically about b, as shown in FIG. 12b, according to the formula $b=(A_1-5A_2+20A_3+20A_4-5A_5+A_6+16)/32$. The operator / denotes division with truncation. The result is clipped to lie in the range $[0, 2^n-1]$.

2. Values for the ½ resolution sub-pixels labelled c are calculated using the same six tap filter as used in step 1 and the six nearest pixels or sub-pixels (A or b) in the vertical direction. Referring now to FIG. 12c, the filter interpolates a value for the ½ resolution sub-pixel c located at unit horizontal and half vertical location based upon the values of the 6 pixels ($A_1$ to $A_6$) situated in a column at unit horizontal locations and unit vertical locations symmetrically about c, according to the formula $c=(A_1-5A_2+20A_3+20A_4-5A_5+A_6+16)/32$. Similarly, a value for the ½ resolution sub-pixel c at half horizontal and half vertical location is calculated according to $c=(b_1-5b_2+20b_3+20b_4-5b_5+b_6+16)/32$. Again, the operator / denotes division with truncation. The values calculated for the c sub-pixels are further clipped to lie in the range $[0, 2^n-1]$.

At this point in the interpolation process the values of all ½ resolution sub-pixels have been calculated and the process proceeds to the calculation of ¼ resolution sub-pixel values.

3. Values for the ¼ resolution sub-pixels labelled d are calculated using linear interpolation and the values of the nearest pixels and/or ½ resolution sub-pixels in the horizontal direction. More specifically, values for ¼ resolution sub-pixels d located at quarter horizontal and unit vertical locations, are calculated by taking the average of the immediately neighbouring pixel at unit horizontal and unit vertical location (pixel A) and the immediately neighbouring ½ resolution sub-pixel at half horizontal and unit vertical location (sub-pixel b), i.e. according to $d=(A+b)/2$. Values for ¼ resolution sub-pixels d located at quarter horizontal and half vertical locations, are calculated by taking the average of the immediately neighbouring ½ resolution sub-pixels c which lie at unit horizontal and half vertical location and half horizontal and half vertical locations respectively, i.e. according to $d=(c_1+c_2)/2$. Again operator / indicates division with truncation.

4. Values for the ¼ resolution sub-pixels labelled e are calculated using linear interpolation and the values of the nearest pixels and/or ½ resolution sub-pixels in the vertical direction. In particular, ¼ resolution sub-pixels e at unit horizontal and quarter vertical locations are calculated by taking the average of the immediately neighbouring pixel at unit horizontal and unit vertical location (pixel A) and the immediately neighbouring sub-pixel at unit horizontal and half vertical location (sub-pixel c) according to $e=(A+c)/2$. ¼ resolution sub-pixels $e_3$ at half horizontal and quarter vertical locations are calculated by taking the average of the immediately neighbouring sub-pixel at half horizontal and unit vertical location (sub-pixel b) and the immediately neighbouring sub-pixel at half horizontal and half vertical location (sub-pixel c), according to $e=(b+c)/2$. Furthermore, ¼ resolution sub-pixels e at quarter horizontal and quarter vertical locations are calculated by taking the average of the immediately neighbouring sub-pixels at quarter horizontal and unit vertical location and the corresponding sub-pixel at quarter horizontal and half vertical location (sub-pixels d), according to $e=(d_1+d_2)/2$. Once more, operator / indicates division with truncation.

5. The value for ¼ resolution sub-pixel f is interpolated by averaging the values of the 4 closest pixels values at unit horizontal and vertical locations, according to $f=(A_1+A_2+A_3+A_4+2)/4$, where pixels $A_1$, $A_2$, $A_3$ and $A_4$ are the four nearest original pixels.

A disadvantage of TML5 is that the decoder is computationally complex. This results from the fact that TML5 uses an approach in which interpolation of ¼ resolution sub-pixel values depends upon the interpolation of ½ resolution sub-pixel values. This means that in order to interpolate the values of the ¼ resolution sub-pixels, the values of the ½ resolution sub-pixels from which they are determined must be calculated first. Furthermore, since the values of some of the ¼ resolution sub-pixels depend upon the interpolated values obtained for other ¼ resolution sub-pixels, truncation of the ¼ resolution sub-pixel values has a deleterious effect on the precision of some of the ¼ resolution sub-pixel values. Specifically, the ¼ resolution sub-pixel values are less precise than they would be if calculated from values that had not been truncated and clipped. Another disadvantage of TML5 is that it is necessary to store the values of the ½ resolution sub-pixels in order to interpolate the ¼ resolution sub-pixel values. Therefore, excess memory is required to store a result which is not ultimately required.

The sub-pixel value interpolation scheme according to TML6, referred to herein as direct interpolation, will now be described. In the encoder the interpolation method according to TML6 works like the previously described TML5 interpolation method, except that maximum precision is retained throughout. This is achieved by using intermediate values which are neither rounded nor clipped. A step-by-step description of interpolation method according to TML6 as applied in the encoder is given below with reference to FIGS. 13a, 13b and 13c.

1. The value for the sub-pixel at half unit horizontal and unit vertical location, that is ½ resolution sub-pixel b in FIG. 13a, is obtained by first calculating an intermediate value b using a six tap filter. The filter calculates b based upon the values of the 6 pixels ($A_1$ to A6) situated in a row at unit horizontal locations and unit vertical locations symmetrically about b, as shown in FIG. 13b, according to the formula $b=(A_1-5A_2+20A_3+20A_4-5A_5+A_6)$. The final value of b is then calculated as $b=(b+16)/32$ and is clipped to lie in the range $[0, 2^n-1]$. As before, the operator / denotes division with truncation.

2. Values for the ½ resolution sub-pixels labelled c are obtained by first calculating intermediate values c. Referring to FIG. 13c, an intermediate value c for the ½ resolution sub-pixel c located at unit horizontal and half vertical location is calculated based upon the values of the 6 pixels ($A_1$ to $A_6$) situated in a column at unit horizontal locations and unit vertical locations symmetrically about c, according to the formula $c=(A_1-5A_2+20A_3+20A_4-5A_5+A_6)$. The final value for the ½ resolution sub-pixel c located at unit horizontal and half vertical location is then calculated according to $c=(c+16)/32$. Similarly, an intermediate value c for the ½ resolution sub-pixel c at half horizontal and half vertical location is calculated according to $c=(b_1-5b_2+20b_3+20b_4-5b_5+b_6)$. A final value for this ½ resolution sub-pixel is then calculated according to $(c+512)/1024$. Again, the operator / denotes division with truncation and the values calculated for ½ resolution sub-pixels c are further clipped to lie in the range $[0, 2^n-1]$.

3. Values for the ¼ resolution sub-pixels labelled d are calculated as follows. Values for ¼ resolution sub-pixels d located at quarter horizontal and unit vertical locations, are calculated from the value of the immediately neighbouring pixel at unit horizontal and unit vertical location (pixel A) and the intermediate value b calculated in step (1) for the immediately neighbouring ½ resolution sub-pixel at half horizontal and unit vertical location (½ resolution sub-pixel b), according to $d=(32A+b+32)/64$. Values for ¼ resolution sub-pixels d located at quarter horizontal and half vertical locations, are interpolated using the intermediate values c calculated for the immediately neighbouring ½ resolution sub-pixels c which lie at unit horizontal and half vertical location and half horizontal and half vertical locations respectively, according to $d=(32c_1+c_2+1024)/2048$. Again operator / indicates division with truncation and the finally obtained ¼ resolution sub-pixel values d are clipped to lie in the range $[0, 2^n-1]$.

4. Values for the ¼ resolution sub-pixels labelled e are calculated as follows. Values for ¼ resolution sub-pixels e located at unit horizontal and quarter vertical locations are calculated from the value of the immediately neighbouring pixel at unit horizontal and unit vertical location (pixel A) and the intermediate value c calculated in step (2) for the immediately neighbouring ½ resolution sub-pixel at unit horizontal and half vertical location, according to $e=(32A+c+32)/64$. Values for ¼ resolution sub-pixels e located at half horizontal and quarter vertical locations are calculated from the intermediate value b calculated in step (1) for the immediately neighbouring ½ resolution sub-pixel at half horizontal and unit vertical location and the intermediate value c calculated in step (2) for the immediately neighbouring ½ resolution sub-pixel at half horizontal and half vertical location, according to $e=(32b+c+1024)/2048$. Once more, operator / indicates division with truncation and the finally obtained ¼ resolution sub-pixel values e are clipped to lie in the range $[0, 2^n-1]$.

5. Values for ¼ resolution sub-pixels labelled g are computed using the value of the nearest original pixel A and the intermediate values of the three nearest neighbouring ½ resolution sub-pixels, according to $g=(1024A+32b+32c_1+c_2+2048)/4096$. As before, operator / indicates division with truncation and the finally obtained for ¼ resolution sub-pixel values g are clipped to lie in the range $[0, 2^n-1]$.

6. The value for ¼ resolution sub-pixel f is interpolated by averaging the values of the 4 closest pixels at unit horizontal and vertical locations, according to $f=(A_1+A_2+A_3+A_4+2)/4$, where the locations of pixels $A_1$, $A_2$, $A_3$ and $A_4$ are the four nearest original pixels.

In the decoder, sub-pixel values can be obtained directly by applying 6-tap filters in horizontal and vertical directions. In the case of ¼ sub-pixel resolution, referring to FIG. 13a, the filter coefficients applied to pixels and sub-pixels at unit vertical location are [0, 0, 64, 0, 0, 0] for a set of six pixels A, [1, −5, 52, 20, −5, 1] for a set of six sub-pixels d, [2, −10, 40, 40, −10, 2] for a set of six sub-pixels b, and [1, −5, 20, 52, −5, 1] for a set of six sub-pixels d. These filter coefficients are applied to respective sets of pixels or sub-pixels in the same row as the sub-pixel values being interpolated.

After applying the filters in the horizontal and vertical directions, interpolated value c is normalized according to c=(c+2048)/4096 and clipped to lie in the range $[0, 2^n-1]$. When a motion vector points to an integer pixel position in either the horizontal or vertical direction, many zero coefficients are used. In a practical implementation of TML6, different branches are used in the software which are optimised for the different sub-pixel cases so that there are no multiplications by zero coefficients.

It should be noted that in TML6, ¼ resolution sub-pixel values are obtained directly using the intermediate values referred to above and are not derived from rounded and clipped values for ½ resolution sub-pixels. Therefore, in obtaining the ¼ resolution sub-pixel values, it is not necessary to calculate final values for any of the ½ resolution sub-pixels. Specifically, it is not necessary to carry out the truncation and clipping operations associated with the calculation of final values for the ½ resolution sub-pixels. Neither is it necessary to have stored final values for ½ resolution sub-pixels for use in the calculation of the ¼ resolution sub-pixel values. Therefore TML6 is computationally less complex than TML5, as fewer truncating and clipping operations are required. However, a disadvantage of TML6 is that high precision arithmetic is required both in the encoder and in the decoder. High precision interpolation requires more silicon area in ASICs and requires more computations in some CPUs. Furthermore, implementation of direct interpolation as specified in TML6 in an on-demand fashion has a high memory requirement. This is an important factor, particularly in embedded devices.

In view of the previously presented discussion, it should be appreciated that due to the different requirements of the video encoder and decoder with regard to sub-pixel interpolation, there exists a significant problem in developing a method of sub-pixel value interpolation capable of providing satisfactory performance in both the encoder and decoder. Furthermore, neither of the current test models (TML5, TML6) described in the foregoing can provide a solution that is optimum for application in both encoder and decoder.

SUMMARY OF THE INVENTION

According to a first aspect of the invention there is provided method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the fractional horizontal and vertical locations being defined according to $½^x$, where x is a positive integer having a maximum value N, the method comprising:

a) when values for sub-pixels at $½^{N-1}$ unit horizontal and unit vertical locations, and unit horizontal and $½^{N-1}$ unit vertical locations are required, interpolating such values directly using weighted sums of pixels residing at unit horizontal and unit vertical locations;

b) when values for sub-pixels at $½^{N-1}$ unit horizontal and $½^{N-1}$ unit vertical locations are required, interpolating such values directly using a choice of a first weighted sum of values for sub-pixels residing at $½^{N-1}$ unit horizontal and unit vertical locations and a second weighted sum of values for sub-pixels residing at unit horizontal and $½^{N-1}$ unit vertical locations, the first and second weighted sums of values being calculated according to step (a); and c) when a value for a sub-pixel situated at a $½^N$ unit horizontal and $½^N$ unit vertical location is required, interpolating such a value by taking a weighted average of the value of a first sub-pixel or pixel situated at a $½^{N-m}$ unit horizontal and $½^{N-n}$ unit vertical location and the value of a second sub-pixel or pixel located at a $½^{N-p}$ unit horizontal and $½^{N-q}$ unit vertical location, variables m, n, p and q taking integer values in the range 1 to N such that the first and second sub-pixels or pixels are located diagonally with respect to the sub-pixel at $½^N$ unit horizontal and $½^N$ vertical location.

Preferably a first and a second weight are used in the weighted average referred to in (c), the relative magnitudes of the weights being inversely proportional to the (straight-line diagonal) proximity of the first and the second sub-pixel or pixel to the sub-pixel at $½^N$ unit horizontal and $½^N$ vertical location.

In a situation where the first and the second sub-pixel or pixel are symmetrically located with respect to (equidistant from) the sub-pixel at $½^N$ unit horizontal and $½^N$ vertical location, the first and second weights may have equal values.

The first weighted sum of values for sub-pixels residing at $½^{N-1}$ unit horizontal and unit vertical locations in step b) may be used when a sub-pixel at $½^{N-1}$ unit horizontal and $½^N$ unit vertical location is required.

The second weighted sum of values for sub-pixels residing at unit horizontal and $½^{N-1}$ unit vertical locations in step b) may be used when a sub-pixel at $½^N$ unit horizontal and $½^{N-1}$ unit vertical location is required.

In one embodiment, when values for sub-pixels at $½^N$ unit horizontal and unit vertical locations, and $½^N$ horizontal and $½^{N-1}$ vertical locations are required, such values are interpolated by taking the average of the values of a first pixel or sub-pixel located at a vertical location corresponding to that of the sub-pixel being calculated and unit horizontal location and a second pixel or sub-pixel located at a vertical location corresponding to that of the sub-pixel being calculated and $½^{N-1}$ unit horizontal location.

When values for sub-pixels at unit horizontal and $½^N$ unit vertical locations, and $½^{N-1}$ unit horizontal and $½^N$ unit vertical locations are required, they may be interpolated by taking the average of the values of a first pixel or sub-pixel located at a horizontal location corresponding to that of the sub-pixel being calculated and unit vertical location and a second pixel or sub-pixel located at a horizontal location corresponding to that of the sub-pixel being calculated and $½^{N-1}$ unit vertical location.

Values for sub-pixels at $½^N$ unit horizontal and $½^N$ unit vertical locations may be interpolated by taking the average of values of a pixel located at a unit horizontal and unit vertical location, and a sub-pixel located at a $½^{N-1}$ unit horizontal and $½^{N-1}$ unit vertical location.

Values for sub-pixels at $½^N$ unit horizontal and $½^N$ unit vertical locations may be interpolated by taking the average of values of a sub-pixel located at a $½^{N-1}$ unit horizontal and unit vertical location, and a sub-pixel located at a unit horizontal and $½^{N-1}$ unit vertical location.

Values for half of the sub-pixels at $½^N$ unit horizontal and $½^N$ unit vertical locations may be interpolated by taking the average of a first pair of values of a sub-pixel located at a $½^{N-1}$ unit horizontal and unit vertical location, and a sub-pixel located at a unit horizontal and $½^{N-1}$ unit vertical location and values for the other half of the sub-pixels at $½^N$ unit horizontal and $½^N$ unit vertical locations are interpolated by taking the average of a second pair of values of a pixel located at a unit horizontal and unit vertical location, and a sub-pixel located at a $½^{N-1}$ unit horizontal and $½^{N-1}$ unit vertical location.

Values for sub-pixels at $\frac{1}{2}^N$ unit horizontal and $\frac{1}{2}^N$ unit vertical locations are alternately interpolated for one such sub-pixel by taking the average of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and values and for a neighbouring such sub-pixel by taking the average of a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

The sub-pixels at $\frac{1}{2}^N$ unit horizontal and $\frac{1}{2}^N$ unit vertical locations may be alternately interpolated in a horizontal direction.

The sub-pixels at $\frac{1}{2}^N$ unit horizontal and $\frac{1}{2}^N$ unit vertical locations may be alternately interpolated in a horizontal direction.

When values for some sub-pixels at $\frac{1}{2}^N$ unit horizontal and $\frac{1}{2}^N$ unit vertical locations are required, such values may be interpolated by taking the average of a plurality of nearest neighbouring pixels.

At least one of step a) and step b) interpolating sub-pixel values directly using weighted sums may involve the calculation of an intermediate value for the sub-pixel values having a dynamic range greater than the specified dynamic range.

The intermediate value for a sub-pixel having $\frac{1}{2}^{N-1}$ sub-pixel resolution may be used the calculation of a sub-pixel value having $\frac{1}{2}^N$ sub-pixel resolution.

According to a second aspect of the invention, there is provided a method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the method comprising:

a) when values for sub-pixels at half unit horizontal and unit vertical locations, and unit horizontal and half unit vertical locations are required, interpolating such values directly using weighted sums of pixels residing at unit horizontal and unit vertical locations;

b) when values for sub-pixels at half unit horizontal and half unit vertical locations are required, interpolating such values directly using a weighted sum of values for sub-pixels residing at half unit horizontal and unit vertical locations calculated according to step (a); and c) when values for sub-pixels at quarter unit horizontal and quarter unit vertical locations are required, interpolating such values by taking the average of at least one pair of a first pair of values of a sub-pixel located at a half unit horizontal and unit vertical location, and a sub-pixel located at a unit horizontal and half unit vertical location and a second pair of values of a pixel located at a unit horizontal and unit vertical location, and a sub-pixel located at a half unit horizontal and half unit vertical location.

According to a third aspect of the invention, there is provided a method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the fractional horizontal and vertical locations being defined according to $\frac{1}{2}^x$ where x is a positive integer having a maximum value N, the method comprising:

a) when values for sub-pixels at $\frac{1}{2}^{N-1}$ unit horizontal and unit vertical locations, and unit horizontal and $\frac{1}{2}^{N-1}$ unit vertical locations are required, interpolating such values directly using weighted sums of pixels residing at unit horizontal and unit vertical locations;

b) when a value for a sub-pixel at a sub-pixel horizontal and sub-pixel vertical location is required, interpolating such a value directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

The sub-pixels used in the first weighted sum may be sub-pixels residing at $\frac{1}{2}^{N-1}$ unit horizontal and unit vertical locations and the first weighted sum may be used to interpolate a value for a sub-pixel at $\frac{1}{2}^{N-1}$ unit horizontal and $\frac{1}{2}^N$ unit vertical location.

The sub-pixels used in the second weighted sum may be sub-pixels residing at unit horizontal and $\frac{1}{2}^{N-1}$ unit vertical locations and the second weighted sum may be used to interpolate a value for a sub-pixel at $\frac{1}{2}^N$ unit horizontal and $\frac{1}{2}^{N-1}$ unit vertical location.

When values for sub-pixels at $\frac{1}{2}^N$ unit horizontal and $\frac{1}{2}^N$ unit vertical locations are required, they may be interpolated by taking the average of at least one pair of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

In the foregoing, N may be equal an integer selected from a list consisting of the values 2, 3, and 4.

Sub-pixels at quarter unit horizontal location are to be interpreted as being sub-pixels having as their left-hand nearest neighbour a pixel at unit horizontal location and as their right-hand nearest neighbour a sub-pixel at half unit horizontal location as well as sub-pixels having as their left-hand nearest neighbour a sub-pixel at half unit horizontal location and as their right-hand nearest neighbour a pixel at unit horizontal location. Correspondingly, sub-pixels at quarter unit vertical location are to be interpreted as being sub-pixels having as their upper nearest neighbour a pixel at unit vertical location and as their lower nearest neighbour a sub-pixel at half unit vertical location as well as sub-pixels having as their upper nearest neighbour a sub-pixel at half unit vertical location and as their lower nearest neighbour a pixel at unit vertical location.

The term dynamic range, refers to the range of values which the sub-pixel values and the weighted sums can take.

Preferably changing the dynamic range, whether by extending it or reducing it, means changing the number of bits which are used to represent the dynamic range.

In an embodiment of the invention, the method is applied to an image that is sub-divided into a number of image blocks. Preferably each image block comprises four corners, each corner being defined by a pixel located at a unit horizontal and unit vertical location. Preferably the method is applied to each image block as the block becomes available for sub-pixel value interpolation. Alternatively, sub-pixel value interpolation according to the method of the invention is performed once all image blocks of an image have become available for sub-pixel value interpolation.

Preferably the method is used in video encoding. Preferably the method is used in video decoding.

In one embodiment of the invention, when used in encoding, the method is carried out as before-hand interpolation, in which values for all sub-pixels at half unit locations and values for all sub-pixels at quarter unit locations are calculated and stored before being subsequently used in the determination of a prediction frame during motion predictive coding. In alternative embodiments, the method is carried out as a combination of before-hand and on-demand interpolation. In this case, a certain proportion or category of sub-pixel values is calculated and stored before being used in the determination of a prediction frame and certain other sub-pixel values are calculated only when required during motion predictive coding.

Preferably, when the method is used in decoding, sub-pixels are only interpolated when their need is indicated by a motion vector.

According to a fourth aspect of the invention, there is provided a video coder for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^x$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^N$ unit horizontal and $\frac{1}{2}^N$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

The video coder may comprise a video encoder. It may comprise a video decoder. There may be a codec comprising both the video encoder and the video decoder.

According to a fifth aspect of the invention, there is provided a communications terminal comprising a video coder for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^x$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^N$ unit horizontal and $\frac{1}{2}^N$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

The communications terminal may comprise a video encoder. It may comprise a video decoder. Preferably, it comprises a video codec comprising a video encoder and a video decoder.

Preferably the communications terminal comprising a user interface, a processor and at least one of a transmitting block and a receiving block, and a video coder according to at least one of the third and fourth aspects of the invention. Preferably the processor controls the operation of the transmitting block and/or the receiving block and the video coder.

According to a sixth aspect of the invention, there is provided a telecommunications system comprising a communications terminal and a network, the telecommunications network and the communications terminal being connected by a communications link over which coded video can be transmitted, the communications terminal comprising a video coder for coding for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^x$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^N$ unit horizontal and $\frac{1}{2}^N$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

Preferably the telecommunications system is a mobile telecommunications system comprising a mobile communications terminal and a wireless network, the connection between the mobile communications terminal and the wireless network being formed by a radio link. Preferably the network enables the communications terminal to communicate with other communications terminals connected to the network over communications links between the other communications terminals and the network.

According to a seventh aspect of the invention, there is provided a telecommunications system comprising a communications terminal and a network, the telecommunications network and the communications terminal being connected by a communications link over which coded video can be transmitted, the network comprising a video coder for coding for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^x$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^N$ unit horizontal and $\frac{1}{2}^N$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

According to an eighth aspect of the invention there is provided a video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

The interpolator may be further adapted to form the first weighted sum using the values of sub-pixels residing at $\frac{1}{2}^{N-1}$ unit horizontal and unit vertical locations and to use the first weighted sum to interpolate a value for a sub-pixel at $\frac{1}{2}^{N-1}$ unit horizontal and $\frac{1}{2}^N$ unit vertical location.

The interpolator may be further adapted to form the second weighted sum using the values of sub-pixels residing at unit horizontal and $\frac{1}{2}^{N-1}$ unit vertical locations and to use the second weighted sum to interpolate a value for a sub-pixel at $\frac{1}{2}^N$ unit horizontal and $\frac{1}{2}^{N-1}$ unit vertical location.

The interpolator may be further adapted to interpolate values for sub-pixels at $\frac{1}{2}^N$ unit horizontal and $\frac{1}{2}^N$ unit vertical locations by taking the average of at least one pair of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

According to a ninth aspect of the invention there is provided a communications terminal comprising a video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

According to a tenth aspect of the invention there is provided a telecommunications system comprising a communications terminal and a network, the telecommunications network and the communications terminal being connected by a communications link over which coded video can be transmitted, the communications terminal comprising a video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

According to an eleventh aspect of the invention there is provided a telecommunications system comprising a communications terminal and a network, the telecommunications network and the communications terminal being connected by a communications link over which coded video can be transmitted, the network comprising a video coder for coding for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

BRIEF DESCRIPTION OF THE FIGURES

An embodiment of the invention will now be described by way of example only with reference to the accompanying drawings in which:

FIGS. 4a, 4b, and 4c show steps in block-matching;

Figure 12A:
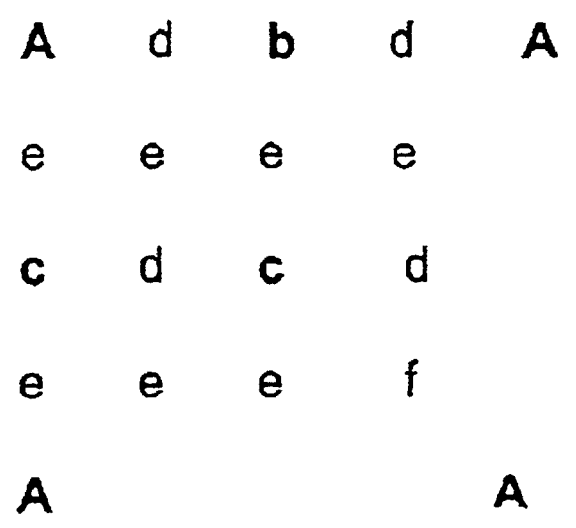

FIG. 12a shows a notation for describing pixel and sub-pixel locations specific to TML5;

FIG. 12b shows interpolation of a half resolution sub-pixels;

FIG. 12c shows interpolation of a half resolution sub-pixels;

Figure 13A:
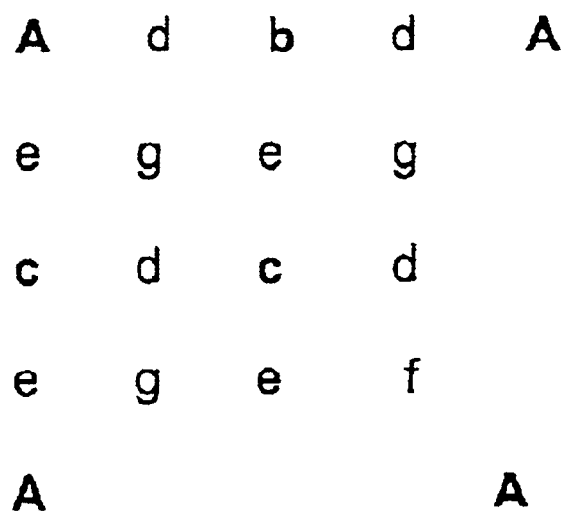

FIG. 13a shows a notation for describing pixel and sub-pixel locations specific to TML6;

FIG. 13c shows interpolation of a half resolution sub-pixels;

FIG. 14 shows a notation for describing pixel and sub-pixel locations specific to the invention;

FIG. 14c shows interpolation of a half resolution sub-pixels according to the invention;

FIG. 19 shows a numbering scheme for each of the 15 sub-pixel positions;

FIG. 20 shows nomenclature used to describe pixels, half resolution sub-pixels, quarter resolution sub-pixels and eighth resolution sub-pixels

FIG. 22 shows nomenclature used to describe eighth resolution sub-pixels within an image.

DETAILED DESCRIPTION

FIGS. 1 to 5, 12a, 12b, 12c, 13a, 13b, and 13c have been described in the foregoing.

Figure 1:
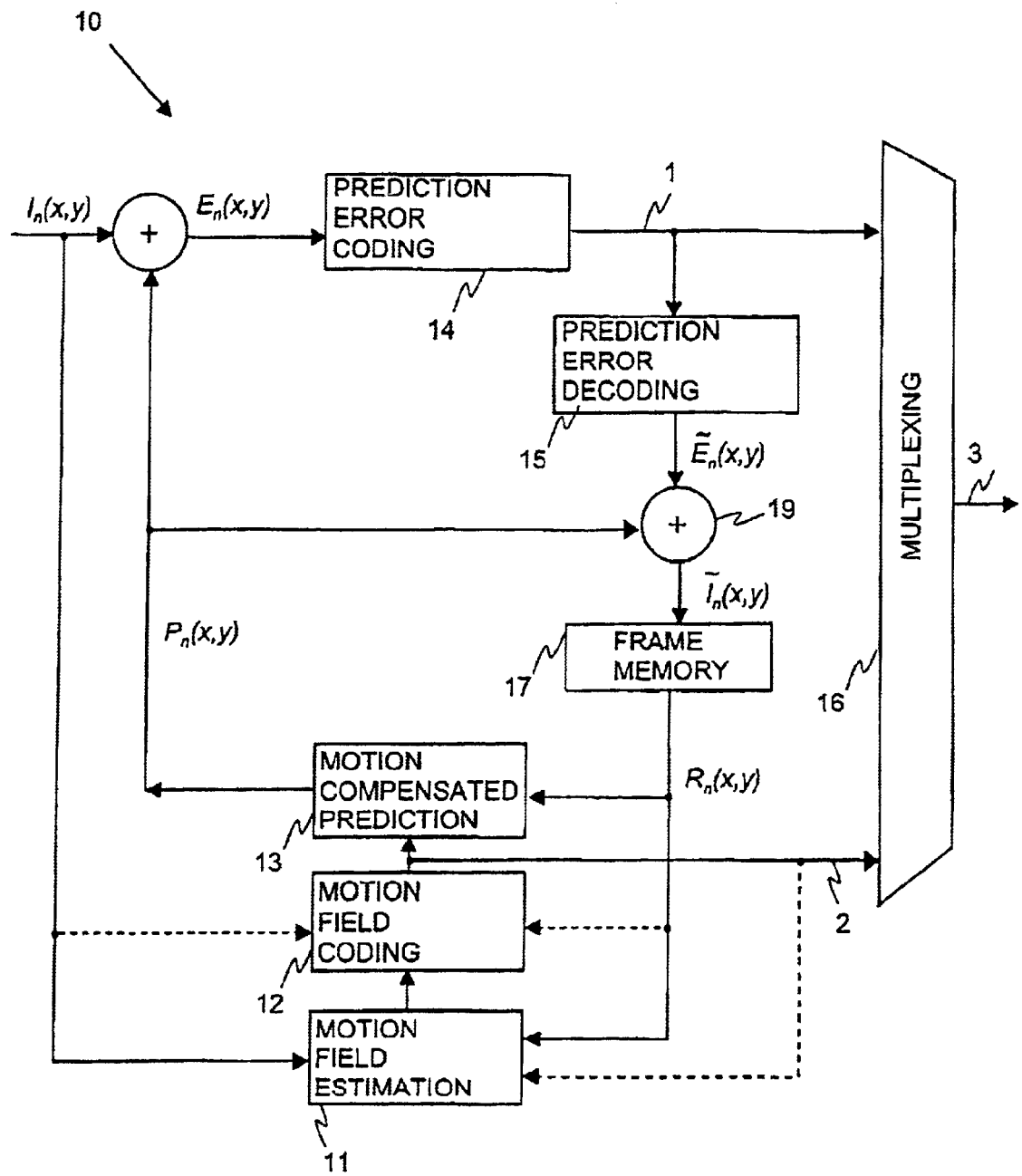
FIG. 1 shows a video encoder according to the prior art.
Figure 2:
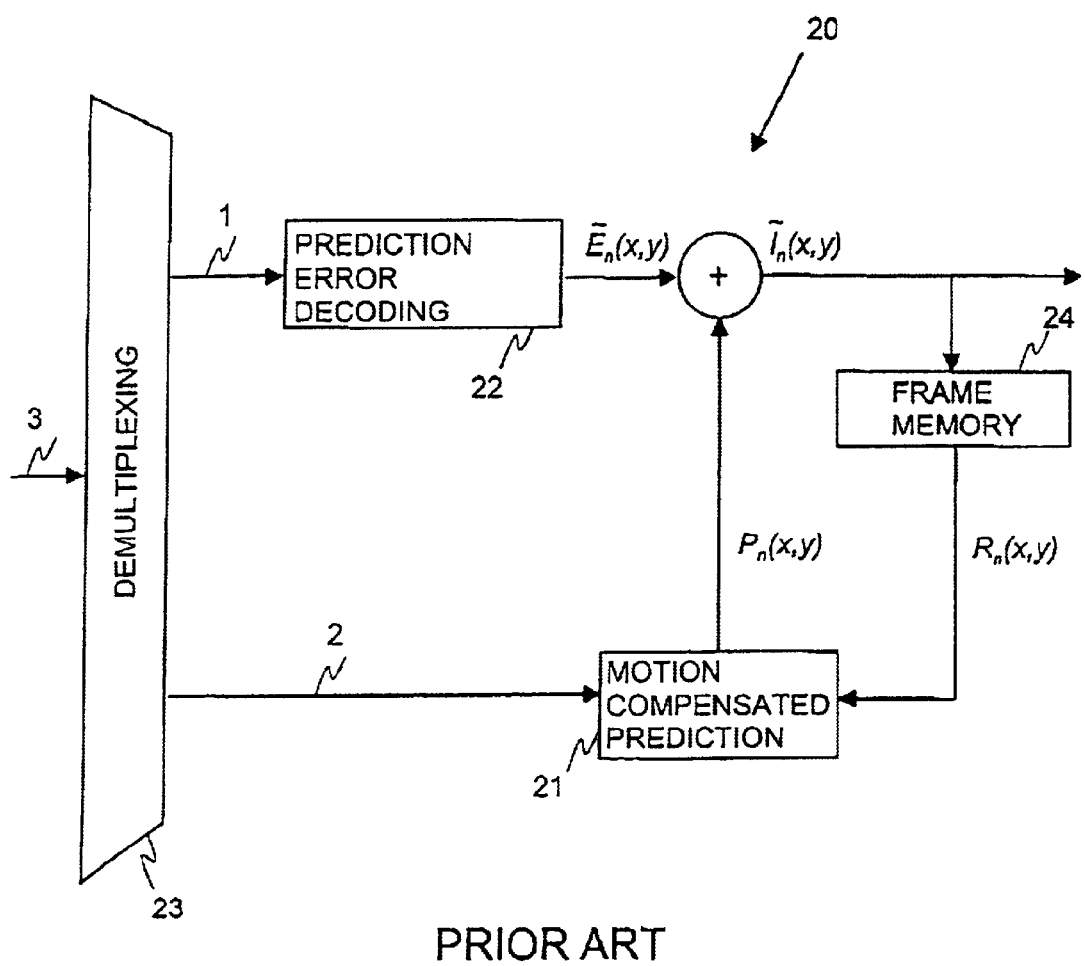
FIG. 2 shows a video decoder according to the prior art.
Figure 3:
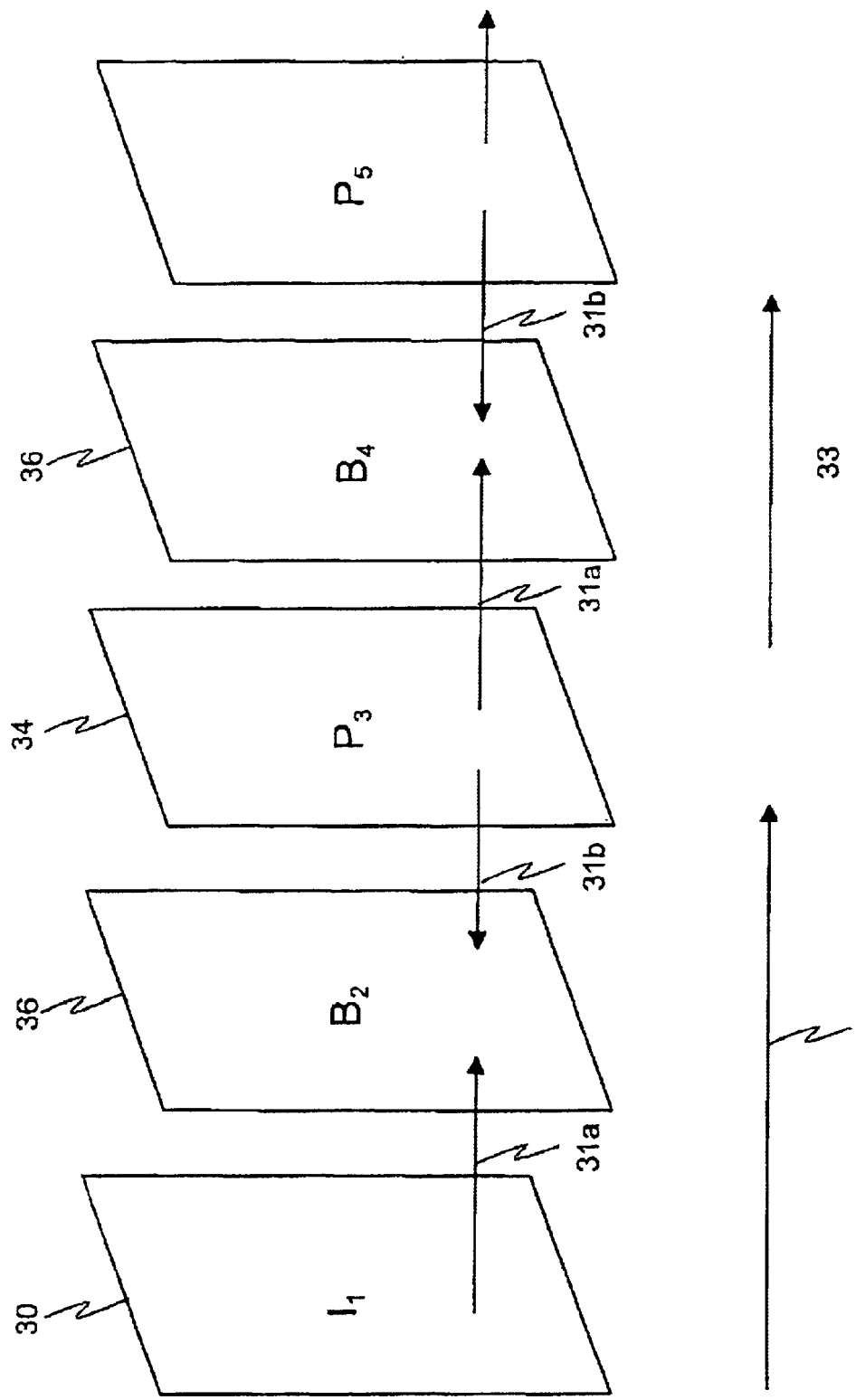
FIG. 3 shows the types of frames used in video encoding.
Figure 5:
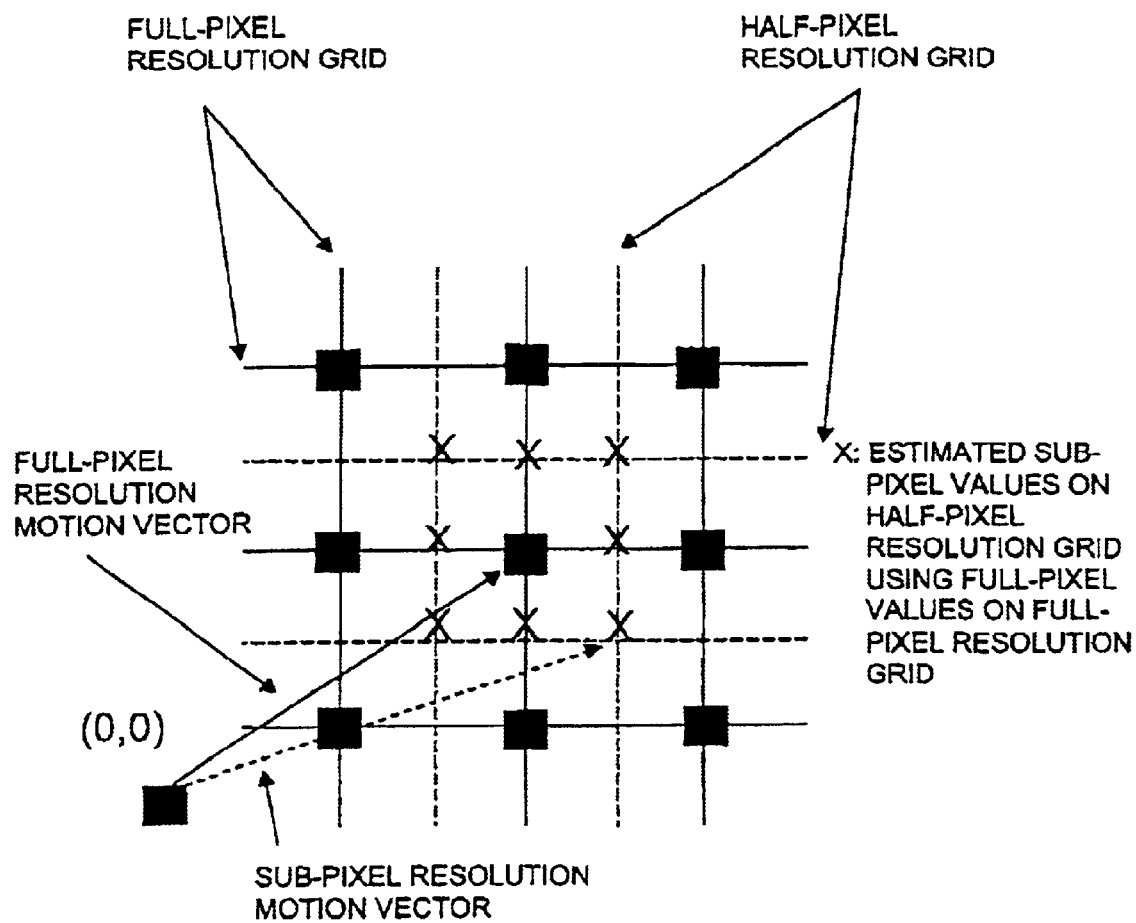
FIG. 5 illustrates the process of motion estimation to sub-pixel resolution.
Figure 6:
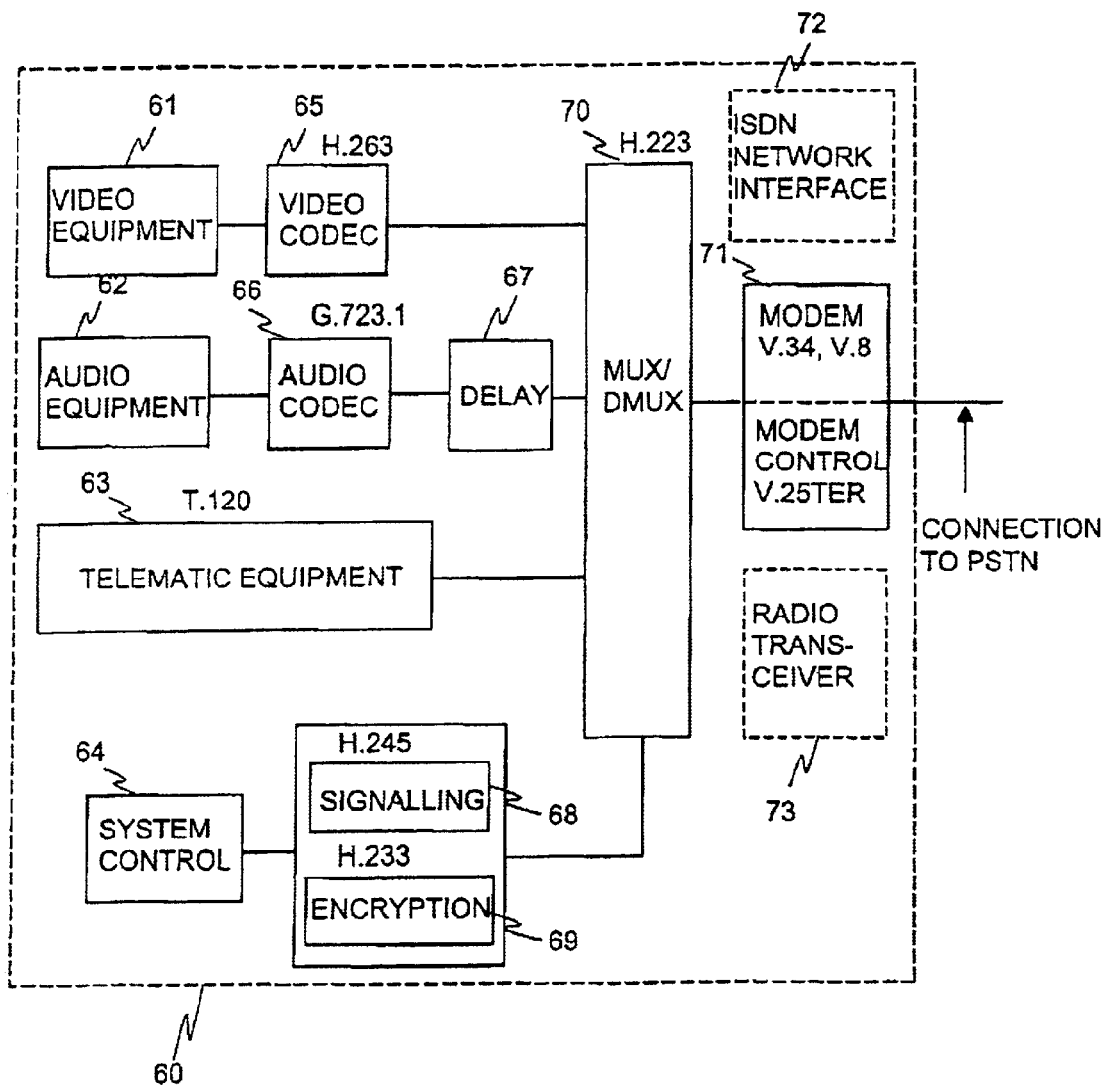
FIG. 6 shows a terminal device comprising video encoding and decoding equipment in which the method of the invention may be implemented.

FIG. 6 presents a terminal device comprising video encoding and decoding equipment which may be adapted to operate in accordance with the present invention. More precisely, the figure illustrates a multimedia terminal 60 implemented according to ITU-T recommendation H.324. The terminal can be regarded as a multimedia transceiver device. It includes elements that capture, encode and multiplex multimedia data streams for transmission via a communications network, as well as elements that receive, de-multiplex, decode and display received multimedia content. ITU-T recommendation H.324 defines the overall operation of the terminal and refers to other recommendations that govern the operation of its various constituent parts. This kind of multimedia terminal can be used in real-time applications such as conversational videotelephony, or non real-time applications such as the retrieval/streaming of video clips, for example from a multimedia content server in the Internet.

In the context of the present invention, it should be appreciated that the H.324 terminal shown in FIG. 6 is only one of a number of alternative multimedia terminal implementations suited to application of the inventive method. It should also be noted that a number of alternatives exist relating to the location and implementation of the terminal equipment. As illustrated in FIG. 6, the multimedia terminal may be located in communications equipment connected to a fixed line telephone network such as an analogue PSTN (Public Switched Telephone Network). In this case the multimedia terminal is equipped with a modem 71, compliant with ITU-T recommendations V.8, V.34 and optionally V.8bis. Alternatively, the multimedia terminal may be connected to an external modem. The modem enables conversion of the multiplexed digital data and control signals produced by the multimedia terminal into an analogue form suitable for transmission over the PSTN. It further enables the multimedia terminal to receive data and control signals in analogue form from the PSTN and to convert them into a digital data stream that can be demulitplexed and processed in an appropriate manner by the terminal.

An H.324 multimedia terminal may also be implemented in such a way that it can be connected directly to a digital fixed line network, such as an ISDN (Integrated Services Digital Network). In this case the modem 71 is replaced with an ISDN user-network interface. In FIG. 6, this ISDN user-network interface is represented by alternative block 72.

H.324 multimedia terminals may also be adapted for use in mobile communication applications. If used with a wireless communication link, the modem 71 can be replaced with any appropriate wireless interface, as represented by alternative block 73 in FIG. 6. For example, an H.324/M multimedia terminal can include a radio transceiver enabling connection to the current $2^{nd}$ generation GSM mobile telephone network, or the proposed $3^{rd}$ generation UMTS (Universal Mobile Telephone System).

It should be noted that in multimedia terminals designed for two-way communication, that is for transmission and reception of video data, it is advantageous to provide both a video encoder and video decoder implemented according to the present invention. Such an encoder and decoder pair is often implemented as a single combined functional unit, referred to as a 'codec'.

Because a video encoder according to the invention performs motion compensated video encoding to sub-pixel resolution using a specific interpolation scheme and a particular combination of before-hand and on-demand sub-pixel value interpolation, it is generally necessary for a video decoder of a receiving terminal to be implemented in a manner compatible with the encoder of the transmitting terminal which formed the compressed video data stream. Failure to ensure this compatibility may have an adverse effect on the quality of the motion compensation and the accuracy of reconstructed video frames.

A typical H.324 multimedia terminal will now be described in further detail with reference to FIG. 6.

The multimedia terminal 60 includes a variety of elements referred to as 'terminal equipment'. This includes video, audio and telematic devices, denoted generically by reference numbers 61, 62 and 63, respectively. The video equipment 61 may include, for example, a video camera for capturing video images, a monitor for displaying received video content and optional video processing equipment. The audio equipment 62 typically includes a microphone, for example for capturing spoken messages, and a loudspeaker for reproducing received audio content. The audio equipment may also include additional audio processing units.

The telematic equipment 63, may include a data terminal, keyboard, electronic whiteboard or a still image transceiver, such as a fax unit.

The video equipment 61 is coupled to a video codec 65. The video codec 65 comprises a video encoder and a corresponding video decoder both implemented according to the invention. Such an encoder and a decoder will be described in the following. The video codec 65 is responsible for encoding captured video data in an appropriate form for further transmission over a communications link and decoding compressed video content received from the communications network. In the example illustrated in FIG. 6, the video codec is implemented according to ITU-T recommendation H.263, with appropriate modifications to implement the sub-pixel value interpolation method according to the invention in both the encoder and the decoder of the video codec.

Similarly, the terminal's audio equipment is coupled to an audio codec, denoted in FIG. 6 by reference number 66. Like the video codec, the audio codec comprises an encoder/decoder pair. It converts audio data captured by the terminal's audio equipment into a form suitable for transmission over the communications link and transforms encoded audio data received from the network back into a form suitable for reproduction, for example on the terminal's loudspeaker. The output of the audio codec is passed to a delay block 67. This compensates for the delays introduced by the video coding process and thus ensures synchronisation of audio and video content.

The system control block 64 of the multimedia terminal controls end-to-network signalling using an appropriate control protocol (signalling block 68) to establish a common mode of operation between a transmitting and a receiving terminal. The signalling block 68 exchanges information about the encoding and decoding capabilities of the transmitting and receiving terminals and can be used to enable the various coding modes of the video encoder. The system control block 64 also controls the use of data encryption. Information regarding the type of encryption to be used in data transmission is passed from encryption block 69 to the multiplexer/de-multiplexer (MUX/DMUX unit) 70.

During data transmission from the multimedia terminal, the MUX/DMUX unit 70 combines encoded and synchronised video and audio streams with data input from the telematic equipment 63 and possible control data, to form a single bit-stream. Information concerning the type of data encryption (if any) to be applied to the bit-stream, provided by encryption block 69, is used to select an encryption mode. Correspondingly, when a multiplexed and possibly encrypted multimedia bit-stream is being received, MUX/DMUX unit 70 is responsible for decrypting the bit-stream, dividing it into its constituent multimedia components and passing those components to the appropriate codec(s) and/or terminal equipment for decoding and reproduction.

It should be noted that the functional elements of the multimedia terminal, video encoder, decoder and video codec according to the invention can be implemented as software or dedicated hardware, or a combination of the two. The video encoding and decoding methods according to the invention are particularly suited for implementation in the form of a computer program comprising machine-readable instructions for performing the functional steps of the invention. As such, the encoder and decoder according to the invention may be implemented as software code stored on a storage medium and executed in a computer, such as a personal desktop computer, in order to provide that computer with video encoding and/or decoding functionality.

If the multimedia terminal 60 is a mobile terminal, that is if it is equipped with a radio transceiver 73, it will be understood by those skilled in the art that it may also comprise additional elements. In one embodiment it comprises a user interface having a display and a keyboard, which enables operation of the multimedia terminal 60 by a user, together with necessary functional blocks including a central processing unit, such as a microprocessor, which controls the blocks responsible for different functions of the multimedia terminal, a random access memory RAM, a read only memory ROM, and a digital camera. The microprocessor's operating instructions, that is program code corresponding to the basic functions of the multimedia terminal 60, is stored in the read-only memory ROM and can be executed as required by the microprocessor, for example under control of the user. In accordance with the program code, the microprocessor uses the radio transceiver 73 to form a connection with a mobile communication network, enabling the multimedia terminal 60 to transmit information to and receive information from the mobile communication network over a radio path.

The microprocessor monitors the state of the user interface and controls the digital camera. In response to a user command, the microprocessor instructs the camera to record digital images into the RAM. Once an image is captured, or alternatively during the capturing process, the microprocessor segments the image into image segments (for example macroblocks) and uses the encoder to perform motion compensated encoding for the segments in order to generate a compressed image sequence as explained in the foregoing description. A user may command the multimedia terminal 60 to display the captured images on its display or to send the compressed image sequence using the radio transceiver 73 to another multimedia terminal, a video telephone connected to a fixed line network (PSTN) or some other telecommunications device. In a preferred embodiment, transmission of image data is started as soon as the first segment is encoded so that the recipient can start a corresponding decoding process with a minimum delay.

Figure 11:
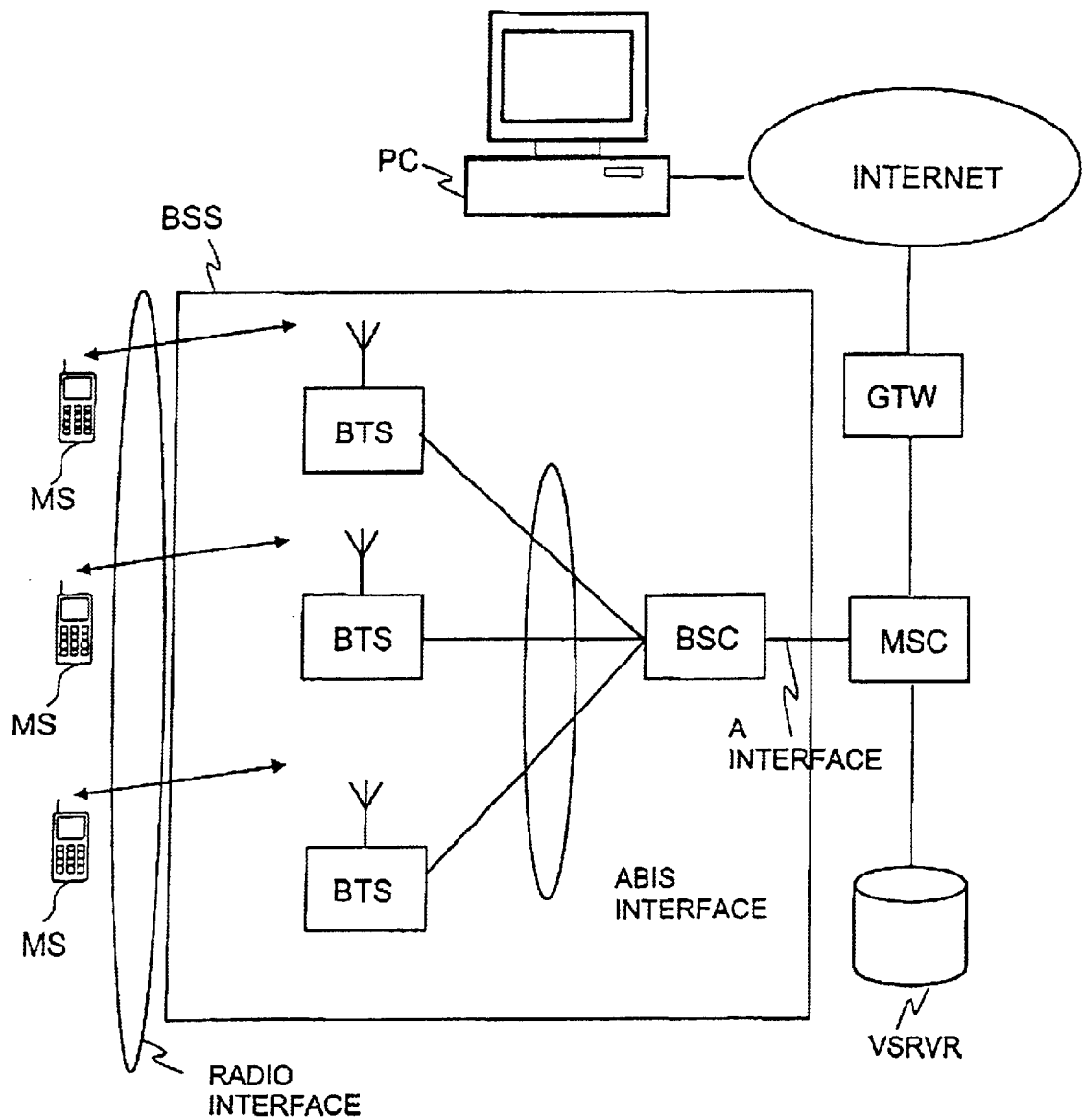
FIG. 11 shows a schematic diagram of a mobile telecommunications network according to an embodiment of the present invention.
Figure 13B:
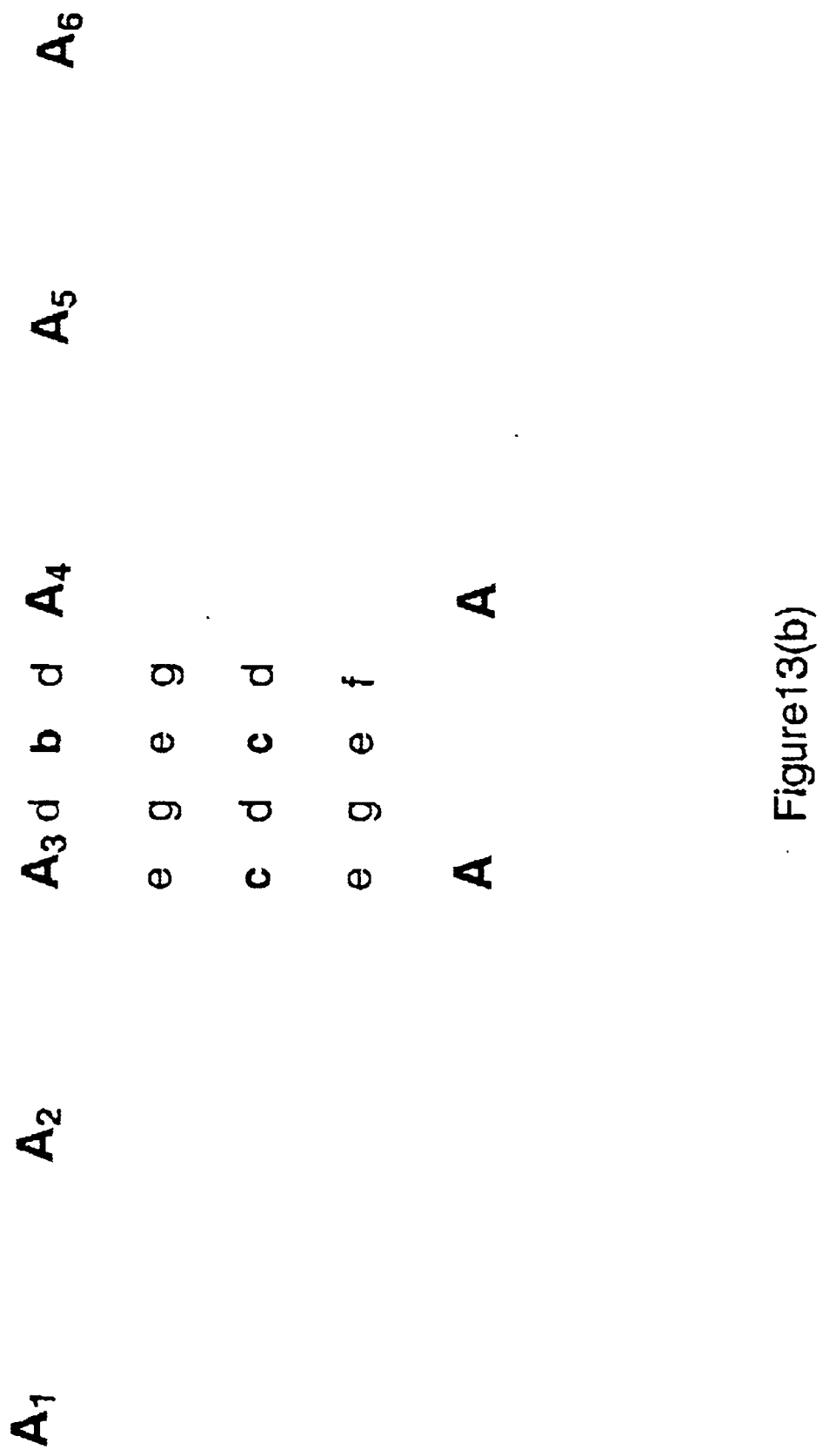
FIG. 13b shows interpolation of a half resolution sub-pixels.

FIG. 11 is a schematic diagram of a mobile telecommunications network according to an embodiment of the invention. Multimedia terminals MS are in communication with base stations BTS by means of a radio link. The base stations BTS are further connected, through a so-called Abis interface, to a base station controller BSC, which controls and manages several base stations.

The entity formed by a number of base stations BTS (typically, by a few tens of base stations) and a single base station controller BSC, controlling the base stations, is called a base station subsystem BSS. Particularly, the base station controller BSC manages radio communication channels and handovers. The base station controller BSC is also connected, through a so-called A interface, to a mobile services switching centre MSC, which co-ordinates the formation of connections to and from mobile stations. A further connection is made, through the mobile service switching centre MSC, to outside the mobile communications network. Outside the mobile communications network there may further reside other network(s) connected to the mobile communications network by gateway(s) GTW, for example the Internet or a Public Switched Telephone Network (PSTN). In such an external network, or within the telecommunications network, there may be located video decoding or encoding stations, such as computers PC. In an embodiment of the invention, the mobile telecommunications network comprises a video server VSRVR to provide video data to a MS subscribing to such a service. The video data is compressed using the motion compensated video compression method as described in the foregoing. The video server may function as a gateway to an online video source or it may comprise previously recorded video clips. Typical videotelephony applications may involve, for example, two mobile stations or one mobile station MS and a videotelephone connected to the PSTN, a PC connected to the Internet or a H.261 compatible terminal connected either to the Internet or to the PSTN.

Figure 7:
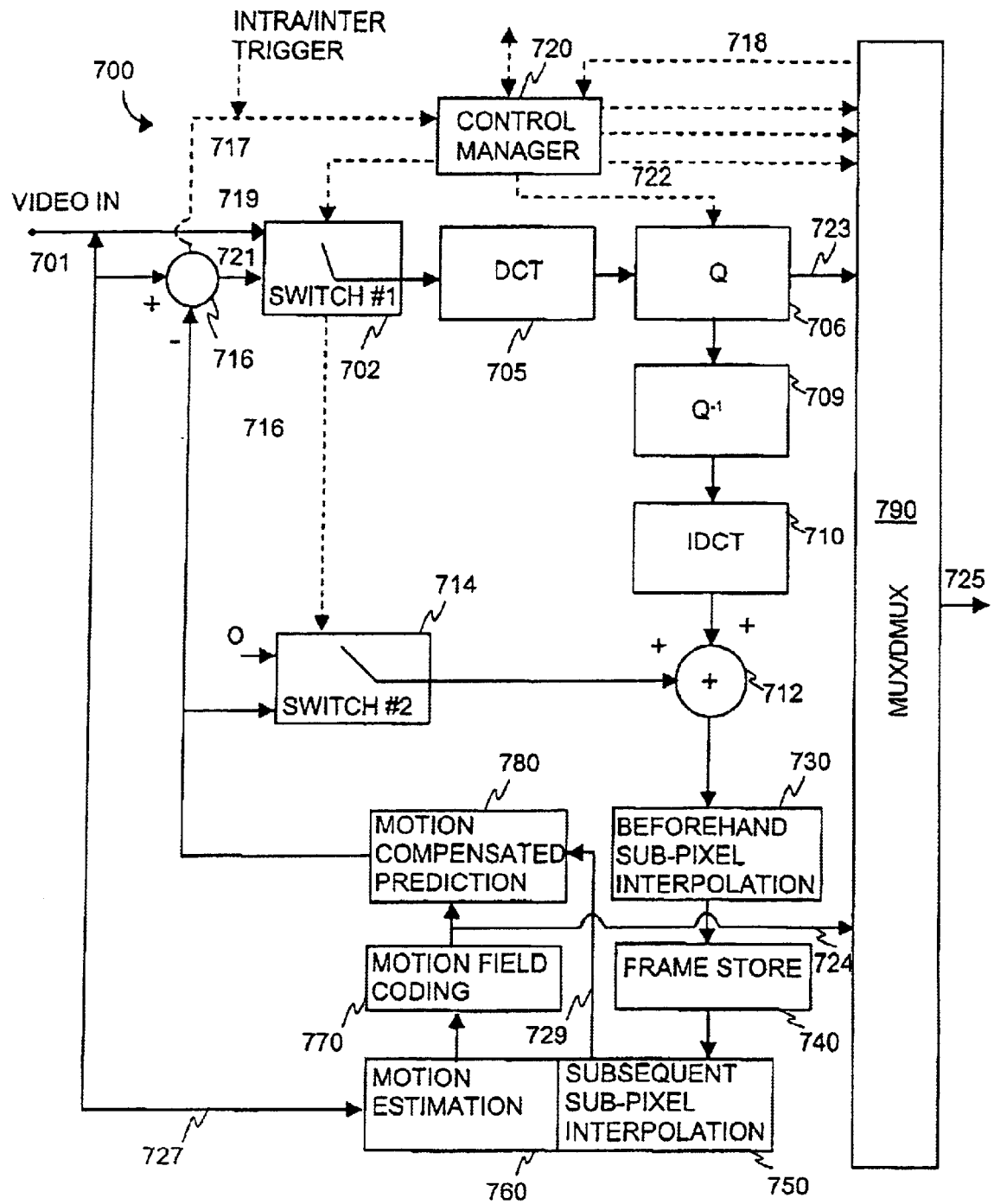
FIG. 7 shows a video encoder according an embodiment of the present invention.
Figure 8:
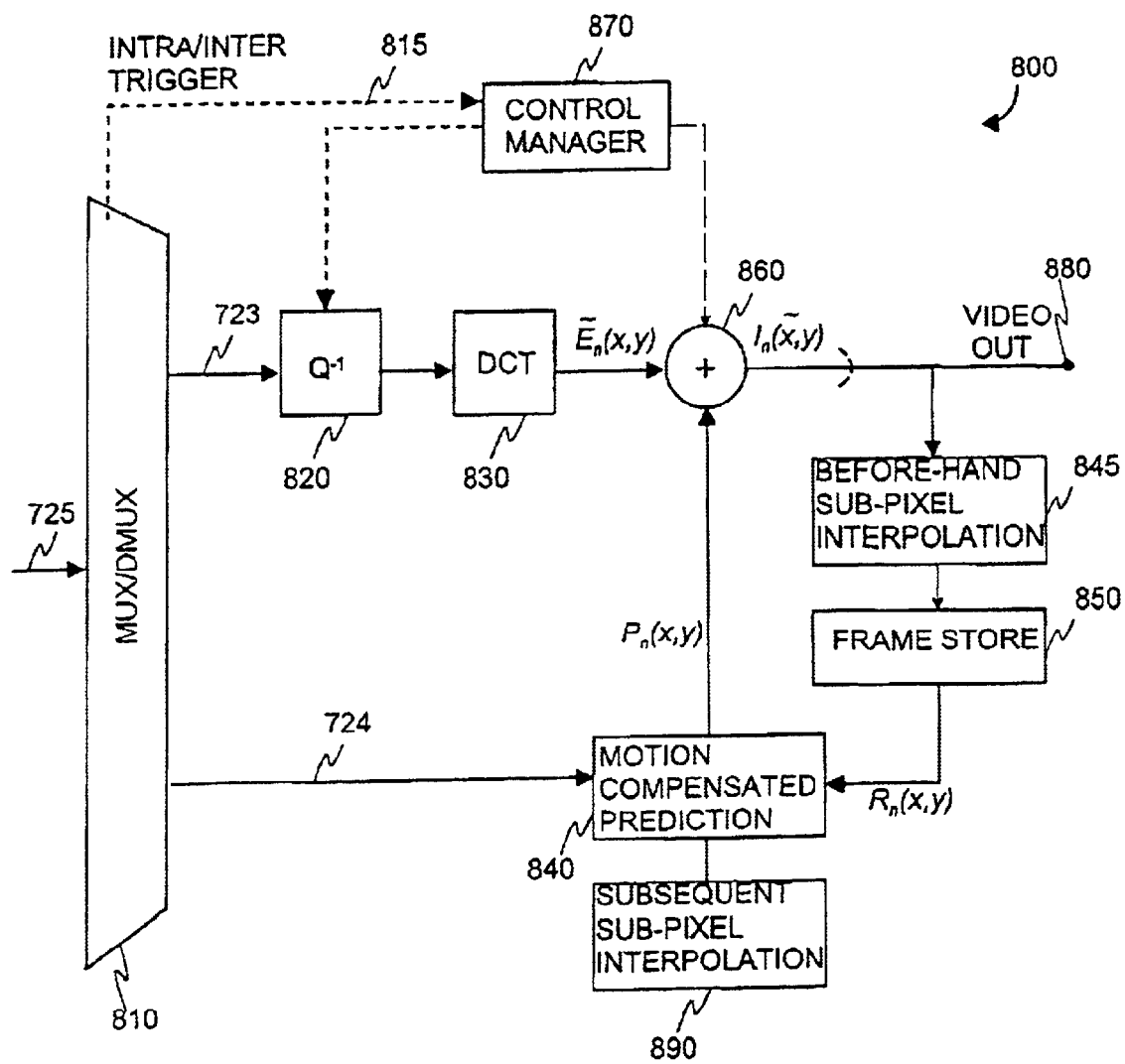
FIG. 8 shows a video decoder according to an embodiment of the present invention.

FIG. 7 shows a video encoder 700 according to an embodiment the invention. FIG. 8 shows a video decoder 800 according to an embodiment the invention.

The encoder 700 comprises an input 701 for receiving a video signal from a camera or other video source (not shown). It further comprises a DCT transformer 705, a quantiser 706, an inverse quantiser 709, an inverse DCT transformer 710, combiners 712 and 716, a before-hand sub-pixel interpolation block 730, a frame store 740 and an on-demand sub-pixel interpolation block 750, implemented in combination with motion estimation block 760. The encoder also comprises a motion field coding block 770 and a motion compensated prediction block 780. Switches 702 and 714 are operated co-operatively by a control manager 720 to switch the encoder between an INTRA-mode of video encoding and an INTER-mode of video encoding. The encoder 700 also comprises a multiplexer unit (MUX/DMUX) 790 to form a single bit-stream from the various types of information produced by the encoder 700 for further transmission to a remote receiving terminal, or for example for storage on a mass storage medium such as a computer hard drive (not shown).

It should be noted that the presence and implementations of before-hand sub-pixel interpolation block 730 and on-demand sub-pixel value interpolation block 750 in the encoder architecture depend on the way in which the sub-pixel interpolation method according to the invention is applied. In embodiments of the invention in which before-hand sub-pixel value interpolation is not performed, encoder 700 does not comprise before-hand sub-pixel value interpolation block 730. In other embodiments of the invention, only before-hand sub-pixel interpolation is performed and thus the encoder does not include on-demand sub-pixel value interpolation block 750. In embodiments in which both before-hand and on-demand sub-pixel value interpolation are performed, both blocks 730 and 750 are present in the encoder 700.

Operation of the encoder 700 according to the invention will now be described in detail. In the description, it will be assumed that each frame of uncompressed video, received from the video source at the input 701, is received and processed on a macroblock-by-macroblock basis, preferably in raster-scan order. It will further be assumed that when the encoding of a new video sequence starts, the first frame of the sequence is encoded in INTRA-mode. Subsequently, the encoder is programmed to code each frame in INTER-format, unless one of the following conditions is met: 1) it is judged that the current frame being coded is so dissimilar from the reference frame used in its prediction that excessive prediction error information is produced; 2) a predefined INTRA frame repetition interval has expired; or 3) feedback is received from a receiving terminal indicating a request for a frame to be coded in INTRA format.

The occurrence of condition 1) is detected by monitoring the output of the combiner 716. The combiner 716 forms a difference between the current macroblock of the frame being coded and its prediction, produced in the motion compensated prediction block 780. If a measure of this difference (for example a sum of absolute differences of pixel values) exceeds a predetermined threshold, the combiner 716 informs the control manager 720 via a control line 717 and the control manager 720 operates the switches 702 and 714 so as to switch the encoder 700 into INTRA coding mode. Occurrence of condition 2) is monitored by means of a timer or frame counter implemented in the control manager 720, in such a way that if the timer expires, or the frame counter reaches a predetermined number of frames, the control manager 720 operates the switches 702 and 714 to switch the encoder into INTRA coding mode. Condition 3) is triggered if the control manager 720 receives a feedback signal from, for example, a receiving terminal, via control line 718 indicating that an INTRA frame refresh is required by the receiving terminal. Such a condition might arise, for example, if a previously transmitted frame were badly corrupted by interference during its transmission, rendering it impossible to decode at the receiver. In this situation, the receiver would issue a request for the next frame to be encoded in INTRA format, thus re-initialising the coding sequence.

It will further be assumed that the encoder and decoder are implemented in such a way as to allow the determination of motion vectors with a spatial resolution of up to quarter-pixel resolution. As will be seen in the following, finer levels of resolution are also possible.

Operation of the encoder 700 in INTRA coding mode will now be described. In INTRA-mode, the control manager 720 operates the switch 702 to accept video input from input line 719. The video signal input is received macroblock by macroblock from input 701 via the input line 719 and each macroblock of original image pixels is transformed into DCT coefficients by the DCT transformer 705. The DCT coefficients are then passed to the quantiser 706, where they are quantised using a quantisation parameter QP. Selection of the quantisation parameter QP is controlled by the control manager 720 via control line 722. Each DCT transformed and quantised macroblock that makes up the INTRA coded image information 723 of the frame is passed from the quantiser 706 to the MUX/DMUX 790. The MUX/DMUX 790 combines the INTRA coded image information with possible control information (for example header data, quantisation parameter information, error correction data etc.) to form a single bit-stream of coded image information 725. Variable length coding (VLC) is used to reduce redundancy of the compressed video bit-stream, as is known to those skilled in the art.

A locally decoded picture is formed in the encoder 700 by passing the data output by the quantiser 706 through inverse quantiser 709 and applying an inverse DCT transform 710 to the inverse-quantised data. The resulting data is then input to the combiner 712. In INTRA mode, switch 714 is set so that the input to the combiner 712 via the switch 714 is set to zero. In this way, the operation performed by the combiner 712 is equivalent to passing the decoded image data formed by the inverse quantiser 709 and the inverse DCT transform 710 unaltered.

In embodiments of the invention in which before-hand sub-pixel value interpolation is performed, the output from combiner 712 is applied to before-hand sub-pixel interpolation block 730. The input to the before-hand sub-pixel value interpolation block 730 takes the form of decoded image blocks. In the before-hand sub-pixel value interpolation block 730, each decoded macroblock is subjected to sub-pixel interpolation in such a way that a predetermined sub-set of sub-pixel resolution sub-pixel values is calculated according to the interpolation method of the invention and is stored together with the decoded pixel values in frame store 740.

In embodiments in which before-hand sub-pixel interpolation is not performed, before-hand sub-pixel interpolation block is not present in the encoder architecture and the output from combiner 712, comprising decoded image blocks, is applied directly to frame store 740.

As subsequent macroblocks of the current frame are received and undergo the previously described coding and decoding steps in blocks 705, 706, 709, 710, 712, a decoded version of the INTRA frame is built up in the frame store 740. When the last macroblock of the current frame has been INTRA coded and subsequently decoded, the frame store 740 contains a completely decoded frame, available for use as a prediction reference frame in coding a subsequently received video frame in INTER format. In embodiments of the invention in which before-hand sub-pixel value interpolation is performed, the reference frame held in frame store 740 is at least partially interpolated to sub-pixel resolution.

Operation of the encoder 700 in INTER coding mode will now be described. In INTER coding mode, the control manager 720 operates switch 702 to receive its input from line 721, which comprises the output of the combiner 716. The combiner 716 forms prediction error information representing the difference between the current macroblock of the frame being coded and its prediction, produced in the motion compensated prediction block 780. The prediction error information is DCT transformed in block 705 and quantised in block 706 to form a macroblock of DCT transformed and quantised prediction error information. Each macroblock of DCT transformed and quantised prediction error information is passed from the quantiser 706 to the MUX/DMUX unit 790. The MUX/DMUX unit 790 combines the prediction error information 723 with motion coefficients 724 (described in the following) and control information (for example header data, quantisation parameter information, error correction data etc.) to form a single bit-stream of coded image information, 725.

Locally decoded prediction error information for the each macroblock of the INTER coded frame is then formed in the encoder 700 by passing the encoded prediction error information 723 output by the quantiser 706 through the inverse quantiser 709 and applying an inverse DCT transform in block 710. The resulting locally decoded macroblock of prediction error information is then input to combiner 712. In INTER-mode, switch 714 is set so that the combiner 712 also receives motion predicted macroblocks for the current INTER frame, produced in the motion compensated prediction block 780. The combiner 712 combines these two pieces of information to produce reconstructed image blocks for the current INTER frame.

As described above when considering INTRA coded frames, in embodiments of the invention in which before-hand sub-pixel value interpolation is performed, the output from combiner 712 is applied to the before-hand sub-pixel interpolation block 730. Thus, the input to the before-hand sub-pixel value interpolation block 730 in INTER coding mode also takes the form of decoded image blocks. In the before-hand sub-pixel value interpolation block 730, each decoded macroblock is subjected to sub-pixel interpolation in such a way that a predetermined sub-set of sub-pixel values is calculated according to the interpolation method of the invention and is stored together with the decoded pixel values in frame store 740. In embodiments in which before-hand sub-pixel interpolation is not performed, before-hand sub-pixel interpolation block is not present in the encoder architecture and the output from combiner 712, comprising decoded image blocks, is applied directly to frame store 740.

As subsequent macroblocks of the video signal are received from the video source and undergo the previously described coding and decoding steps in blocks 705, 706, 709, 710, 712, a decoded version of the INTER frame is built up in the frame store 740. When the last macroblock of the frame has been INTER coded and subsequently decoded, the frame store 740 contains a completely decoded frame, available for use as a prediction reference frame in encoding a subsequently received video frame in INTER format. In embodiments of the invention in which before-hand sub-pixel value interpolation is performed, the reference frame held in frame store 740 is at least partially interpolated to sub-pixel resolution.

Formation of a prediction for a macroblock of the current frame will now be described.

Any frame encoded in INTER format requires a reference frame for motion compensated prediction. This means, inter alia, that when encoding a video sequence, the first frame to be encoded, whether it is the first frame in the sequence, or some other frame, must be encoded in INTRA format. This, in turn, means that when the video encoder 700 is switched into INTER coding mode by control manager 720, a complete reference frame, formed by locally decoding a previously encoded frame, is already available in the frame store 740 of the encoder. In general, the reference frame is formed by locally decoding either an INTRA coded frame or an INTER coded frame.

The first step in forming a prediction for a macroblock of the current frame is performed by motion estimation block 760. The motion estimation block 760 receives the current macroblock of the frame being coded via line 727 and performs a block matching operation in order to identify a region in the reference frame which corresponds substantially with the current macroblock. According to the invention, the block-matching process is performed to sub-pixel resolution in a manner that depends on the implementation of the encoder 700 and the degree of before-hand sub-pixel interpolation performed. However, the basic principle behind the block-matching process is similar in all cases. Specifically, motion estimation block 760 performs block-matching by calculating difference values (e.g. sums of absolute differences) representing the difference in pixel values between the macroblock of the current frame under examination and candidate best-matching regions of pixels/sub-pixels in the reference frame. A difference value is produced for all possible offsets (e.g. quarter- or one eighth sub-pixel precision x, y displacements) between the macroblock of the current frame and candidate test region within a predefined search region of the reference frame and motion estimation block 760 determines the smallest calculated difference value. The offset between the macroblock in the current frame and the candidate test region of pixel values/sub-pixel values in the reference frame that yields the smallest difference value defines the motion vector for the macroblock in question. In certain embodiments of the invention, an initial estimate for the motion vector having unit pixel precision is first determined and then refined to a finer level of sub-pixel precision, as described in the foregoing.

In embodiments of the encoder in which before-hand sub-pixel value interpolation is not performed, all sub-pixel values required in the block matching process are calculated in on-demand sub-pixel value interpolation block 750. Motion estimation block 760 controls on-demand sub-pixel value interpolation block 750 to calculate each sub-pixel value needed in the block-matching process in an on-demand fashion, as and when it is required. In this case, motion estimation block 760 may be implemented so as to perform block-matching as a one-step process, in which case a motion vector with the desired sub-pixel resolution is sought directly, or it may be implemented so as to perform block-matching as a two step process. If the two-step process is adopted, the first step may comprise a search for e.g. a full or half-pixel resolution motion vector and the second step is performed in order to refine the the motion vector to the desired sub-pixel resolution. As block matching is an exhaustive process, in which blocks of n×m pixels in the current frame are compared one-by-one with blocks of n×m pixels or sub-pixels in the interpolated reference frame, it should be appreciated that a sub-pixel calculated in an on-demand fashion by the on-demand pixel interpolation block 750 may need to be calculated multiple times as successive difference values are determined. In a video encoder, this approach is not the most efficient possible in terms of computational complexity/burden.

In embodiments of the encoder which use only before-hand sub-pixel value interpolation, block-matching may be performed as a one step process, as all sub-pixel values of the reference frame required to determine a motion vector with the desired sub-pixel resolution are calculated beforehand in block 730 and stored in frame store 740. Thus, they are directly available for use in the block-matching process and can be retrieved as required from frame store 740 by motion estimation block 760. However, even in the case where all sub-pixel values are available from frame store 740, it is still more computationally efficient to perform block-matching as a two-step process, as fewer difference calculations are required. It should be appreciated that while full before-hand sub-pixel value interpolation reduces computational complexity in the encoder, it is not the most efficient approach in terms of memory consumption.

In embodiments of the encoder in which both before-hand and on-demand sub-pixel value interpolation are used, motion estimation block 760 is implemented in such a way that it can retrieve sub-pixel values previously calculated in before-hand sub-pixel value interpolation block 730 and stored in frame store 740 and further control on-demand sub-pixel value interpolation block 750 to calculate any additional sub-pixel values that may be required. The block-matching process may be performed as a one-step or a two-step process. If a two-step implementation is used, before-hand calculated sub-pixel values retrieved from frame store 740 may be used in the first step of the process and the second step may be implemented so as to use sub-pixel values calculated by on-demand sub-pixel value interpolation block 750. In this case, certain sub-pixel values used in the second step of the block matching process may need to be calculated multiple times as successive comparisons are made, but the number of such duplicate calculations is significantly less than if before-hand sub-pixel value calculation is not used. Furthermore, memory consumption is reduced with respect to embodiments in which only before-hand sub-pixel value interpolation is used.

Once the motion estimation block 760 has produced a motion vector for the macroblock of the current frame under examination, it outputs the motion vector to the motion field coding block 770. Motion field coding block 770 then approximates the motion vector received from motion estimation block 760 using a motion model. The motion model generally comprises a set of basis functions. More specifically, the motion field coding block 770 represents the motion vector as a set of coefficient values (known as motion coefficients) which, when multiplied by the basis functions, form an approximation of the motion vector. The motion coefficients 724 are passed from motion field coding block 770 to motion compensated prediction block 780. Motion compensated prediction block 780 also receives the pixel/sub-pixel values of the best-matching candidate test region of the reference frame identified by motion estimation block 760. In FIG. 7, these values are shown to be passed via line 729 from on-demand sub-pixel interpolation block 750. In alternative embodiments of the invention, the pixel values in question are provided from the motion estimation block 760 itself.

Using the approximate representation of the motion vector generated by motion field coding block 770 and the pixel/sub-pixel values of the best-matching candidate test region, motion compensated prediction block 780 produces a macroblock of predicted pixel values. The macroblock of predicted pixel values represents a prediction for the pixel values of the current macroblock generated from the interpolated reference frame. The macroblock of predicted pixel values is passed to the combiner 716 where it is subtracted from the new current frame in order to produce prediction error information 723 for the macroblock, as described in the foregoing.

The motion coefficients 724 formed by motion field coding block are also passed to the MUX/DMUX unit 790, where they are combined with prediction error information 723 for the macroblock in question and possible control information from control manager 720 to form an encoded video stream 725 for transmission to a receiving terminal.

Operation of a video decoder 800 according to the invention will now be described. Referring to FIG. 8, the decoder 800 comprises a demultiplexing unit (MUX/DMUX) 810, which receives the encoded video stream 725 from the encoder 700 and demultiplexes it, an inverse quantiser 820, an inverse DCT transformer 830, a motion compensated prediction block 840, a frame store 850, a combiner 860, a control manager 870, an output 880, before-hand sub-pixel value interpolation block 845 and on-demand sub-pixel interpolation block 890 associated with the motion compensated prediction block 840. In practice the control manager 870 of the decoder 800 and the control manager 720 of the encoder 700 may be the same processor. This may be the case if the encoder 700 and decoder 800 are part of the same video codec.

FIG. 8 shows an embodiment in which a combination of before-hand and on-demand sub-pixel value interpolation is used in the decoder. In other embodiments, only before-hand sub-pixel value interpolation is used, in which case decoder 800 does not include on-demand sub-pixel value interpolation block 890. In a preferred embodiment of the invention, no before-hand sub-pixel value interpolation is used in the decoder and therefore before-hand sub-pixel value interpolation block 845 is omitted from the decoder architecture. If both before-hand and on-demand sub-pixel value interpolation are performed, the decoder comprises both blocks 845 and 890.

The control manager 870 controls the operation of the decoder 800 in response to whether an INTRA or an INTER frame is being decoded. An INTRA/INTER trigger control signal, which causes the decoder to switch between decoding modes is derived, for example, from picture type information provided in the header portion of each compressed video frame received from the encoder. The INTRA/INTER trigger control signal is passed to control manager 870 via control line 815, together with other video codec control signals demultiplexed from the encoded video stream 725 by the MUX/DMUX unit 810.

When an INTRA frame is decoded, the encoded video stream 725 is demultiplexed into INTRA coded macroblocks and control information. No motion vectors are included in the encoded video stream 725 for an INTRA coded frame. The decoding process is performed macroblock-by-macroblock. When the encoded information 723 for a macroblock is extracted from video stream 725 by MUX/DMUX unit 810, it is passed to inverse quantiser 820. The control manager controls inverse quantiser 820 to apply a suitable level of inverse quantisation to the macroblock of encoded information, according to control information provided in video stream 725. The inverse quantised macroblock is then inversely transformed in the inverse DCT transformer 830 to form a decoded block of image information. Control manager 870 controls combiner 860 to prevent any reference information being used in the decoding of the INTRA coded macroblock. The decoded block of image information is passed to the video output 880 of the decoder.

In embodiments of the decoder which employ before-hand sub-pixel value interpolation, the decoded block of image information (i.e. pixel values) produced as a result of the inverse quantisation and inverse transform operations performed in blocks 820 and 830 is passed to before-hand sub-pixel value interpolation block 845. Here, sub-pixel value interpolation is performed according to the method of the invention, the degree of before-hand sub-pixel value interpolation applied being determined by the details of the decoder implementation. In embodiments of the invention in which on-demand sub-pixel value interpolation is not performed, before-hand sub-pixel value interpolation block 845 interpolates all sub-pixelvalues. In embodiments that use a combination of before-hand and on-demand sub-pixel value interpolation, before-hand sub-pixel value interpolation block 845 interpolates a certain sub-set of sub-pixel values. This may comprise, for example, all sub-pixels at half-pixel locations, or a combination of sub-pixels at half-pixel and one quarter-pixel locations. In any case, after before-hand sub-pixel value interpolation, the interpolated sub-pixel values are stored in frame store 850, together with the original decoded pixel values. As subsequent macroblocks are decoded, before-hand interpolated and stored, a decoded frame, at least partially interpolated to sub-pixel resolution is progressively assembled in the frame store 850 and becomes available for use as a reference frame for motion compensated prediction.

In embodiments of the decoder which do not employ before-hand sub-pixel value interpolation, the decoded block of image information (i.e. pixel values) produced as a result of the inverse quantisation and inverse transform operations performed on the macroblock in blocks 820 and 830 is passed directly to frame store 850. As subsequent macroblocks are decoded and stored, a decoded frame, having unit pixel resolution is progressively assembled in the frame store 850 and becomes available for use as a reference frame for motion compensated prediction.

When an INTER frame is decoded, the encoded video stream 725 is demultiplexed into encoded prediction error information 723 for each macroblock of the frame, associated motion coefficients 724 and control information. Again, the decoding process is performed macroblock-by-macroblock. When the encoded prediction error information 723 for a macroblock is extracted from the video stream 725 by MUX/DMUX unit 810, it is passed to inverse quantiser

820. Control manager 870 controls inverse quantiser 820 to apply a suitable level of inverse quantisation to the macroblock of encoded prediction error information, according to control information received in video stream 725. The inverse quantised macroblock of prediction error information is then inversely transformed in the inverse DCT transformer 830 to yield decoded prediction error information for the macroblock.

The motion coefficients 724 associated with the macroblock in question are extracted from the video stream 725 by MUX/DMUX unit 810 and passed to motion compensated prediction block 840, which reconstructs a motion vector for the macroblock using the same motion model as that used to encode the INTER-coded macroblock in encoder 700. The reconstructed motion vector approximates the motion vector originally determined by motion estimation block 760 of the encoder. The motion compensated prediction block 840 of the decoder uses the reconstructed motion vector to identify the location of a block of pixel/sub-pixel values in a prediction reference frame stored in frame store 850. The reference frame may be, for example, a previously decoded INTRA frame, or a previously decoded INTER frame. In either case, the block of pixel/sub-pixel values indicated by the reconstructed motion vector, represents the prediction of the macroblock in question.

The reconstructed motion vector may point to any pixel or sub-pixel. If the motion vector indicates that the prediction for the current macroblock is formed from pixel values (i.e. the values of pixels at unit pixel locations), these can simply be retrieved from frame store 850, as the values in question are obtained directly during the decoding of each frame. If the motion vector indicates that the prediction for the current macroblock is formed from sub-pixel values, these must either be retrieved from frame store 850, or calculated in on-demand sub-pixel interpolation block 890. Whether sub-pixel values must be calculated, or can simply be retrieved from the frame store, depends on the degree of before-hand sub-pixel value interpolation used in the decoder.

In embodiments of the decoder that do not employ before-hand sub-pixel value interpolation, the required sub-pixel values are all calculated in on-demand sub-pixel value interpolation block 890. On the other hand, in embodiments in which all sub-pixel values are interpolated before-hand, motion compensated prediction block 840 can retrieve the required sub-pixel values directly from the frame store 850. In embodiments that use a combination before-hand and on-demand sub-pixel value interpolation, the action required in order to obtain the required sub-pixel values depends on which sub-pixel values are interpolated before-hand. Taking as an example an embodiment in which all sub-pixel values at half-pixel locations are calculated before-hand, it is evident that if a reconstructed motion vector for a macroblock points to a pixel at unit location or a sub-pixel at half-pixel location, all the pixel or sub-pixel values required to form the prediction for the macroblock are present in the frame store 850 and can be retrieved from there by motion compensated prediction block 840. If, however, the motion vector indicates a sub-pixel at a quarter-pixel location, the sub-pixels required to form the prediction for the macroblock are not present in frame store 850 and are therefore calculated in on-demand sub-pixel value interpolation block 890. In this case, on-demand sub-pixel value interpolation block 890 retrieves any pixel or sub-pixel required to perform the interpolation from frame store 850 and applies the interpolation method described below. Sub-pixel values calculated in on-demand sub-pixel value interpolation block 890 are passed to motion compensated prediction block 840.

Once a prediction for a macroblock has been obtained, the prediction (that is, a macroblock of predicted pixel values) is passed from motion compensated prediction block 840 to combiner 860 where it combined with the decoded prediction error information for the macroblock to form a reconstructed image block which, in turn, is passed to the video output 880 of the decoder.

It should be appreciated that in practical implementations of encoder 700 and decoder 800, the extent to which frames are before-hand sub-pixel interpolated, and thus the amount of on-demand sub-pixel value interpolation that is performed, can be chosen according to, or dictated by, the hardware implementation of the video encoder 700, or the environment in which it is intended to be used. For example, if the memory available to the video encoder is limited, or memory must be reserved for other functions, it is appropriate to limit the amount of before-hand sub-pixel value interpolation that is performed. In other cases, where the microprocessor performing the video encoding operation has limited processing capacity, e.g. the number of operations per second that can be executed is comparatively low, it is more appropriate to restrict the amount of on-demand sub-pixel value interpolation that is performed. In a mobile communications environment, for example, when video encoding and decoding functionality is incorporated in a mobile telephone or similar wireless terminal for communication with a mobile telephone network, both memory and processing power may be limited. In this case a combination of before-hand and on-demand sub-pixel value interpolation may be the best choice to obtain an efficient implementation in the video encoder. In video decoder 800, use of before-hand sub-pixel value is generally not preferred, as it typically results in the calculation of many sub-pixel values that are not actually used in the decoding process. However, it should be appreciated that although different amounts of before-hand and on-demand interpolation can be used in the encoder and decoder in order to optimise the operation of each, both encoder and decoder can be implemented so as to use the same division between before-hand and on-demand sub-pixel value interpolation.

Although the foregoing description does not describe the construction of bi-directionally predicted frames (B-frames) in the encoder 700 and the decoder 800, it should be understood that in embodiments of the invention, such a capability may be provided. Provision of such capability is considered within the ability of one skilled in the art.

An encoder 700 or a decoder 800 according to the invention can be realised using hardware or software, or using a suitable combination of both. An encoder or decoder implemented in software may be, for example, a separate program or a software building block that can be used by various programs. In the above description and in the drawings, the functional blocks are represented as separate units, but the functionality of these blocks can be implemented, for example, in one software program unit.

The encoder 700 and decoder 800 can further be combined in order to form a video codec having both encoding and decoding functionality. In addition to being implemented in a multimedia terminal, such a codec may also be implemented in a network. A codes according to the invention may be a computer program or a computer program element, or it may be implemented at least partly using hardware.

The sub-pixel interpolation method used in the encoder 700 and decoder 800 according to the invention now be described in detail. The method will first be introduced at a general conceptual level and then two preferred embodiments will be described. In the first preferred embodiment, sub-pixel value interpolation is performed to ¼ pixel resolution and in the second the method is extended to ⅛ pixel resolution.

It should be noted that interpolation must produce identical values in the encoder and the decoder, but its implementation should be optimized for both entities separately. For example, in an encoder according to the first embodiment of the invention in which sub-pixel value interpolation is preformed to ¼ pixel resolution, it is most efficient to calculate ½ resolution pixels before-hand and to calculate values for ¼ resolution sub-pixels in an on-demand fashion, only when they are needed during motion estimation. This has the effect of limiting memory usage while keeping the computational complexity/burden at an acceptable level. In the decoder, on the other hand, it is advantageous not to pre-calculate any of the sub-pixels. Therefore, it should be appreciated that a preferred embodiment of the decoder does not include before-hand sub-pixel value interpolation block 845 and all sub-pixel value interpolation is performed in on-demand sub-pixel value interpolation block 890.

Figure 14A:
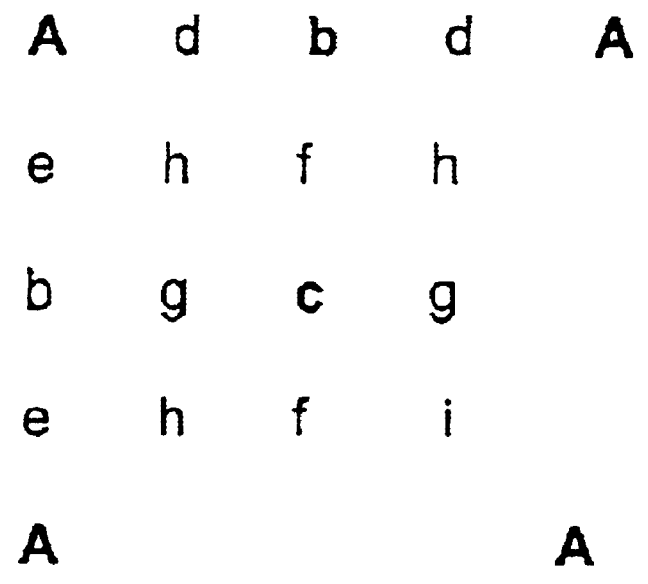

In the description of the interpolation method provided below, references are made to the pixel positions depicted in FIG. 14a. In this figure pixels labelled A represent original pixels (that is, pixels residing at unit horizontal and vertical locations). Pixels labelled with other letters represent sub-pixels that are to be interpolated. The description that follows will adhere to the previously introduced conventions regarding the description of pixel and sub-pixel locations.

Next, the steps required to interpolate all sub-pixel positions are described:

Values for the ½ resolution sub-pixels labelled b are obtained by first calculating an intermediate value b using a Kth order filter, according to:

$$b = \sum_{i=1}^{K} x_i A_i \qquad (9)$$

where $x_i$ is a vector of filter coefficients, $A_i$ is a corresponding vector of original pixel values A situated at unit horizontal and unit vertical locations, and K is an integer which defines the order of the filter. Thus, equation 9 can be re-expressed as:

$$b = x_1 A_1 + x_2 A_2 + x_3 A_3 + \ldots + x_{K-1} A_{K-1} + x_K A_K \qquad (10)$$

Figure 14B:
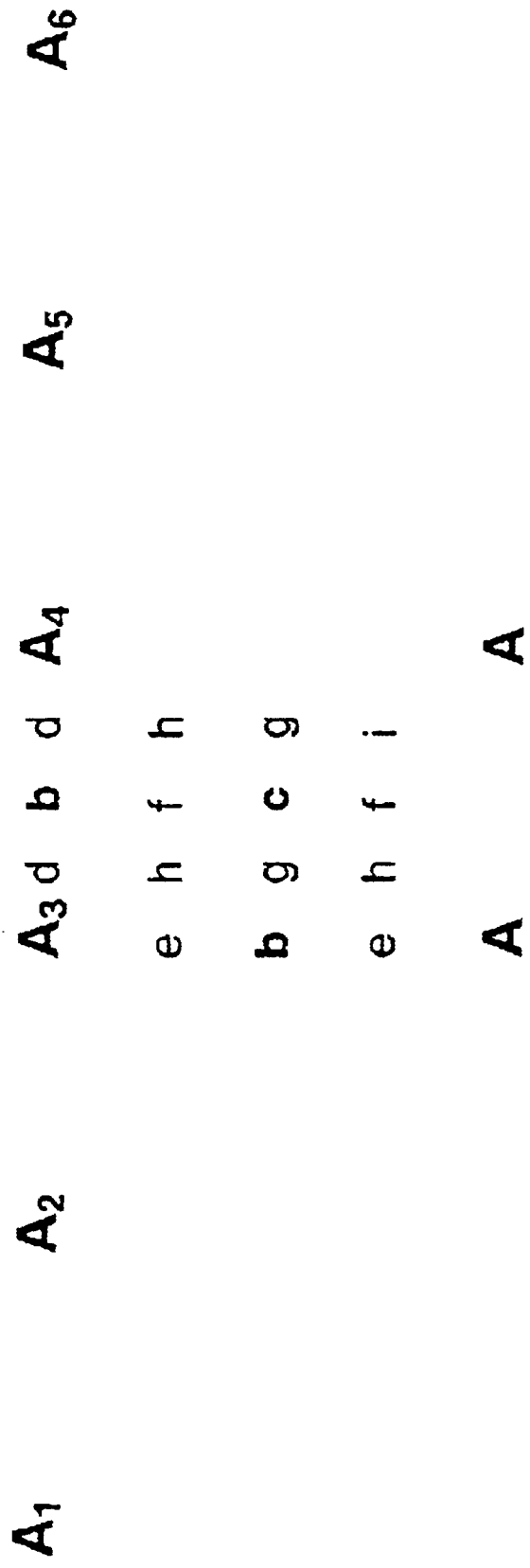
FIG. 14b shows interpolation of a half resolution sub-pixels according to the invention.
Figure 14C:
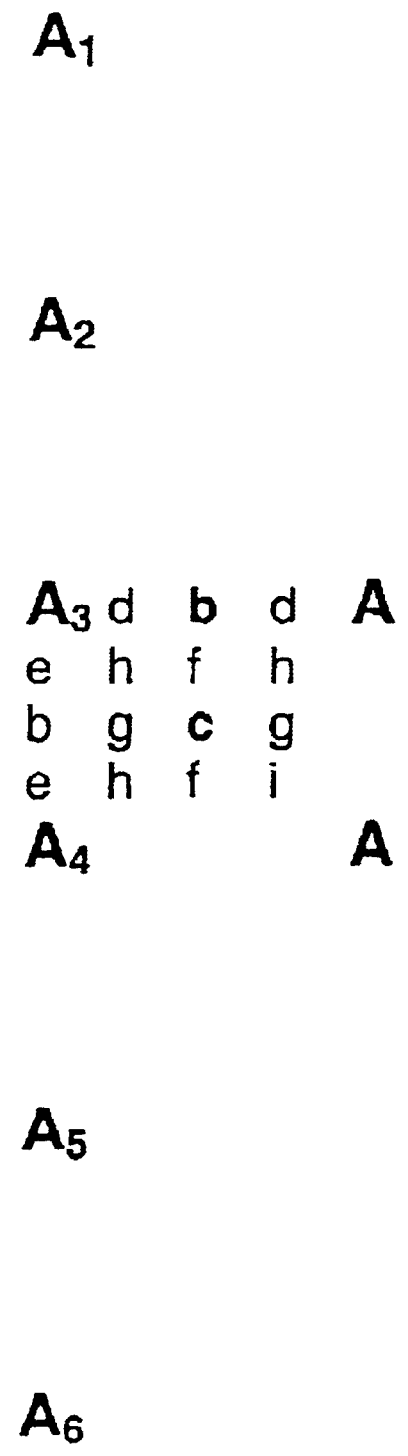

The values of the filter coefficients $x_i$ and the order of the filter K may vary from embodiment to embodiment. Equally, different coefficient values may be used in the calculation of different sub-pixels within an embodiment. In other embodiments, the values of filter coefficients $x_i$ and the order of the filter may depend on which of the ½ resolution b sub-pixels is being interpolated. Pixels $A_i$ are disposed symmetrically with respect to the ½ resolution sub-pixel b being interpolated and are the closest neighbours of that sub-pixel. In the case of the ½ resolution sub-pixel b situated at half horizontal and unit vertical location, pixels $A_i$ are disposed horizontally with respect to b (as shown in FIG. 14b). If the ½ resolution sub-pixel b situated at unit horizontal and half vertical location is being interpolated, pixels $A_i$ are disposed vertically with respect to b (as shown in FIG. 14c).

A final value for ½ resolution sub-pixel b is calculated by dividing intermediate value b by a constant scale, truncating it to obtain an integer number and clipping the result to lie in the range $[0, 2^n-1]$. In alternative embodiments of the invention rounding may be performed instead of truncation. Preferably, constant scale, is chosen to be equal to the sum of filter coefficients $x_i$.

A value for the ½ resolution sub-pixel labelled c is also obtained by first calculating an intermediate value c using an Mth order filter, according to:

$$c = \sum_{i=1}^{M} y_i b_i \qquad (11)$$

where $y_i$ is a vector of filter coefficients, $b_i$ is a corresponding vector of intermediate values $b_i$ in the horizontal or vertical direction. i.e.:

$$c = y_1 b_1 + y_2 b_2 + y_3 b_3 + \ldots + y_{M-1} b_{M-1} + y_M b_M \qquad (12)$$

The values of the filter coefficients $y_i$ and the order of the filter M may vary from embodiment to embodiment. Equally, different coefficient values may be used in the calculation of different sub-pixels within an embodiment. Preferably, the b values are intermediate values for ½ resolution sub-pixels b which are disposed symmetrically with respect to ½ resolution sub-pixel c and are the closest neighbours of sub-pixel c. In an embodiment of the invention, the ½ resolution sub-pixels b are disposed horizontally with respect to sub-pixel c, in an alternative embodiment they are disposed vertically with respect to sub-pixel c.

A final value of ½ resolution sub-pixel c is computed by dividing intermediate value c by a constant $scale_2$, truncating it to obtain an integer number and clipping the result to lie in the range $[0, 2^n-1]$. In alternative embodiments of the invention rounding may be performed instead of truncation. Preferably, constant $scale_2$ is equal to $scale_1 * scale_1$.

It should be noted that the use of intermediate values b in the horizontal direction leads to the same result as using intermediate values b in the vertical direction.

Figure 15:
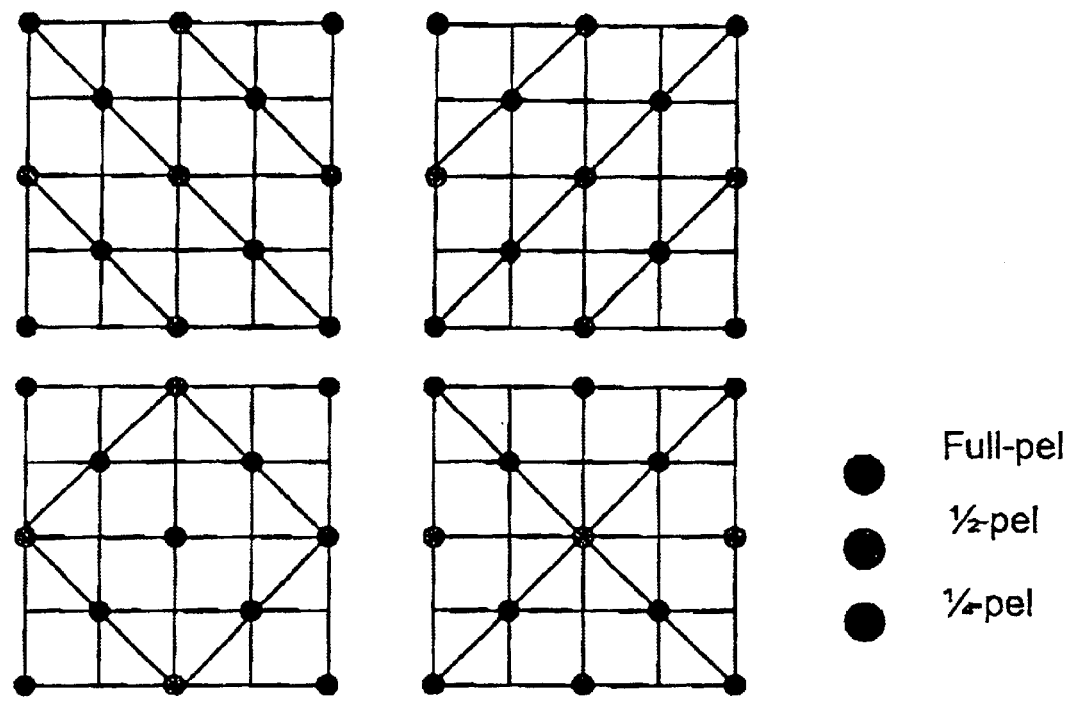
FIG. 15 shows possible choices of diagonal interpolation for sub-pixels.

There are two alternatives for interpolating values for the ¼ resolution sub-pixels labelled h. Both involve linear interpolation along a diagonal line linking ½ resolution sub-pixels neighbouring the ¼ resolution sub-pixel h being interpolated. In a first embodiment, a value for sub-pixel h is calculated by averaging the values of the two ½ resolution sub-pixels b closest to sub-pixel h. In a second embodiment, a value for sub-pixel h is calculated by averaging the values of the closest pixel A and the closest ½ resolution sub-pixel c. It should be appreciated that this provides the possibility of using different combinations of diagonal interpolations to determine the values for sub-pixels h within the confines of different groups of 4 image pixels A. However, it should also be realised that the same combination should be used in both the encoder and the decoder in order to produce identical interpolation results. FIG. 15 depicts 4 possible choices of diagonal interpolation for sub-pixels h in adjacent groups of 4 pixels within an image. Simulations in the TML environment have verified that both embodiments result in similar compression efficiency. The second embodiment has higher complexity, since calculation of sub-pixel c requires calculation of several intermediate values. Therefore the first embodiment is preferred.

Values for ¼ resolution sub-pixels labelled d and g are calculated from the values of their nearest horizontal neighbours using linear interpolation. In other words, a value for ¼ resolution sub-pixel d is obtained by averaging values of its nearest horizontal neighbours, original image pixel A and ½ resolution sub-pixel b. Similarly, a value for ¼ resolution sub-pixel g is obtained by taking the average of its two nearest horizontal neighbours, ½ resolution sub-pixels b and c.

Values for ¼ resolution sub-pixels labelled e, f and i are calculated from the values of their nearest neighbours in the vertical direction using linear interpolation. More specifically, a value for ¼ resolution sub-pixel e is obtained by averaging the values of its two nearest vertical neighbours, original image pixel A and ½ resolution sub-pixel b. Similarly, a value for ¼ resolution sub-pixel f is obtained by taking the average of its two nearest vertical neighbours, ½ resolution sub-pixels b and c. In an embodiment of the invention, a value for ¼ resolution sub-pixel i is obtained in manner identical to that just described in connection with ¼ resolution sub-pixel f. However, in an alternative embodiment of the invention, and in common with the H.26 test models TML5 and TML6 previously described, ¼ resolution sub-pixel i is determined using the values of the four closest original image pixels, according to $(A_1+A_2+A_3+A_4+2)/4$.

It should also be noted that in all cases where an average involving pixel and/or sub-pixel values is determined, the average may be formed in any appropriate manner. For example, the value for ¼ resolution sub-pixel d can be defined as $d=(A+b)/2$ or as $d=(A+b+1)/2$. The addition of 1 to the sum of values for pixel A and ½ resolution sub-pixel b has the effect of causing any rounding or truncation operation subsequently applied to round or truncate the value for d to the next highest integer value. This is true for any sum of integer values and may be applied to any of the averaging operations performed according to the method of the invention in order to control rounding or truncation effects.

It should be noted that the sub-pixel value interpolation method according to the invention provides advantages over each of TML5 and TML6.

In contrast to TML5, in which the values of some of the ¼ resolution sub-pixels depend on previously interpolated values obtained for other ¼ resolution sub-pixels, in the method according to the invention, all ¼ resolution sub-pixels are calculated from original image pixels or ½ resolution sub-pixel positions using linear interpolation. Thus, the reduction in precision of those ¼ resolution sub-pixel values which occurs in TML5 due to the intermediate truncation and clipping of the other ¼ resolution sub-pixels from which they are calculated, does not take place in the method according to the invention. In particular, referring to FIG. 14a, ¼ resolution sub-pixels h (and sub-pixel i in one embodiment of the invention) are interpolated diagonally in order to reduce dependency on other ¼-pixels. Furthermore, in the method according to the invention, the number of calculations (and therefore the number of processor cycles) required to obtain a value for those ¼ resolution sub-pixels in the decoder is reduced compared with TML5. Additionally, the calculation of any ¼ resolution sub-pixel value requires a number of calculations which is substantially similar to the number of calculations required to determine any other ¼ resolution sub-pixel value. More specifically, in a situation where the required ½ resolution sub-pixel values are already available, e.g. they have been calculated before-hand, the number of calculations required to interpolate a ¼ resolution sub-pixel value from the pre-calculated ½ resolution sub-pixel values is the same as the number of calculations required to calculate any other ¼ resolution sub-pixel value from the available ½ resolution sub-pixel values.

In comparison with TML6, the method according to the invention does not require high precision arithmetic to be used in the calculation of all sub-pixels. Specifically, as all of the ¼ resolution sub-pixel values are calculated from original image pixels or ½ resolution sub-pixel values using linear interpolation, lower precision arithmetic can be used in their interpolation. Consequently, in hardware implementations of the inventive method, for example in an ASIC (Application Specific Integrated Circuit), the use of lower precision arithmetic reduces the number of components (e.g. gates) that must be devoted to the calculation of ¼ resolution sub-pixel values. This, in turn, reduces the overall area of silicon that must be dedicated to the interpolation function. As the majority of sub-pixels are, in fact, ¼ resolution sub-pixels (12 out of the 15 sub-pixels illustrated in FIG. 14a), the advantage provided by the invention in this respect is particularly significant. In software implementations, where sub-pixel interpolation is performed using the standard instruction set of a general purpose CPU (Central Processor Unit) or using a DSP (Digital Signal Processor), a reduction in the precision of the arithmetic required generally leads to an increase in the speed at which the calculations can be performed. This is particularly advantageous in 'low cost' implementations, in which it is desirable to use a general purpose CPU rather than any form of ASIC.

The method according to the invention provides still further advantages compared with TML5. As mentioned previously, in the decoder only 1 out of the 15 sub-pixel positions is required at any given time, namely that which is indicated by received motion vector information. Therefore, it is advantageous if the value of a sub-pixel in any sub-pixel location can be calculated with the minimum number of steps that result in a correctly interpolated value. The method according to the invention provides this capability. As mentioned in the detailed description provided above, ½ resolution sub-pixel c can be interpolated by filtering in either the vertical or the horizontal direction, the same value being obtained for c regardless of whether horizontal or vertical filtering is used. The decoder can therefore take advantage of this property when calculating values for ¼ resolution sub-pixels f and g in such a way as to minimise the number of operations required in order to obtain the required values. For example, if the decoder requires a value for ¼ resolution sub-pixel f, ½ resolution sub-pixel c should interpolated in the vertical direction. If a value is required for ¼ resolution sub-pixel g, it is advantageous to interpolate a value for c in the horizontal direction. Thus, in general, it can be said that the method according to the invention provides flexibility in the way in which values are derived for certain ¼ resolution sub-pixels. No such flexibility is provided in TML5.

Two specific embodiments will now be described in detail. The first represents a preferred embodiment for calculating sub-pixels with up to ¼ pixel resolution, while in the second, the method according to the invention is extended to the calculation of values for sub-pixels having up to ⅛ pixel resolution. For both embodiments a comparison is provided between the computational complexity/burden resulting from use of the method according to the invention and that which would result from use of the interpolation methods according to TML5 and TML6 in equivalent circumstances.

The preferred embodiment for interpolating sub-pixels at ¼ pixel resolution will be described with reference to FIGS. 14a, 14b and 14c. In the following, it will be assumed that all image pixels and final interpolated values for sub-pixels are represented with 8-bits.

Calculation of ½ resolution sub-pixels at i) half unit horizontal and unit vertical locations and ii) unit horizontal and half unit vertical locations.

1. A value for the sub-pixel at half unit horizontal and unit vertical location, that is ½ resolution sub-pixel b in FIG. 14a, is obtained by first calculating intermediate value $b=(A_1-5A_2+20A_3+20A_4-5A_5+A_6)$ using the values of the six pixels ($A_1$ to $A_6$) which are situated at unit horizontal and unit vertical locations in either the row or the column of pixels containing b and which are disposed symmetrically about b, as shown in FIGS. 14b and 14c. A final value for ½ resolution sub-pixel b is calculated as (b+16)/32 where the operator / denotes division with truncation. The result is clipped to lie in the range [0, 255].

Calculation of ½ resolution sub-pixels at half unit horizontal and half unit vertical locations.

2. A value for the sub-pixel at half unit horizontal and half unit vertical location, that is ½ resolution sub-pixel c in FIG. 14a, is calculated as $c=(b_1-5b_2+20b_3+20b_4-5b_5+b_6+512)/1024$ using the intermediate values b for the six closest ½ resolution sub-pixels which are situated in either the row or the column of sub-pixels containing c and which are disposed symmetrically about c. Again, operator / denotes division with truncation and the result is clipped to lie in the range [0, 255]. As previously explained, using intermediate values b for ½ resolution sub-pixels b in the horizontal direction leads to the same result as using intermediate values b for ½ resolution sub-pixels b in the vertical direction. Thus, in an encoder according to the invention, the direction for interpolating ½ resolution sub-pixels b can be chosen according to a preferred mode of implementation. In a decoder according to the invention, the direction for interpolating sub-pixels b is chosen according to which, if any, ¼ resolution sub-pixels will be interpolated using the result obtained for ½ resolution sub-pixel c.

Calculation of ¼ resolution sub-pixels at i) quarter unit horizontal and unit vertical locations; ii) quarter unit horizontal and half unit vertical locations; iii) unit horizontal and quarter unit vertical locations; and iv) half unit horizontal and quarter unit vertical locations.

3. Values for ¼ resolution sub-pixels d, situated at quarter unit horizontal and unit vertical locations are calculated according to d=(A+b)/2 using the nearest original image pixel A and the closest ½ resolution sub-pixel b in the horizontal direction. Similarly, values for ¼ resolution sub-pixels g, situated at quarter unit horizontal and half unit vertical locations are calculated according to g=(b+c)/2 using the two nearest ½ resolution sub-pixels in the horizontal direction. In a similar manner, values for ¼ resolution sub-pixels e, situated at unit horizontal and quarter unit vertical locations, are calculated according e=(A+b)/2 using the nearest original image pixel A and the closest ½ resolution sub-pixel b in the vertical direction. Values for ¼ resolution sub-pixels f, situated at half unit horizontal and quarter unit vertical locations, are determined from f=(b+c)/2 using the two nearest ½ resolution sub-pixel in the vertical direction. In all cases, operator / denotes division with truncation.

Calculation of ¼ resolution sub-pixels at quarter unit horizontal and quarter unit vertical locations.

4. Values for ¼ resolution sub-pixels h, situated at quarter unit horizontal and quarter unit vertical locations are calculated according to $h=(b_1+b_2)/2$, using the two nearest ½ resolution sub-pixels b in the diagonal direction. Again, operator / denotes division with truncation.

5. A value for the ¼ resolution sub-pixel labeled i is computed from $i=(A_1+A_2+A_3+A_4+2)/4$ using the four nearest original pixels A. Once more, operator / denotes division with truncation.

An analysis of the computational complexity of the first preferred embodiment of the invention will now be presented.

In the encoder, it is likely that the same sub-pixel values will be calculated multiple times. Therefore, and as previously explained, the complexity of the encoder can be reduced by pre-calculating all sub-pixel values and storing them in memory. However, this solution increases memory usage by a large margin. In the preferred embodiment of the invention, in which motion vector accuracy is ¼ pixel resolution in both the horizontal and vertical dimensions, storing pre-calculated sub-pixel values for the whole image requires 16 times the memory required to store the original, non-interpolated image. To reduce memory usage, all ½ resolution sub-pixels can be interpolated before-hand and ¼ resolution sub-pixels can be calculated on-demand, that is, only when they are needed. According to the method of the invention, on-demand interpolation of values for ¼ resolution sub-pixels only requires linear interpolation from ½ resolution sub-pixels. Four times the original picture memory is required to store the pre-calculated ½ resolution sub-pixels since only 8 bits are necessary to represent them.

However, if the same strategy of pre-calculating all ½ resolution sub-pixels using before-hand interpolation is used in conjunction with the direct interpolation scheme of TML6, the memory requirements increase to 9 times the memory required to store the original non-interpolated image. This results from the fact that a larger number of bits is required to store the high precision intermediate values associated with each ½ resolution sub-pixel in TML6. In addition, the complexity of sub-pixel interpolation during motion estimation is higher in TML6, since scaling and clipping has to be performed for every ½ and ¼ sub-pixel location.

Figure 16:
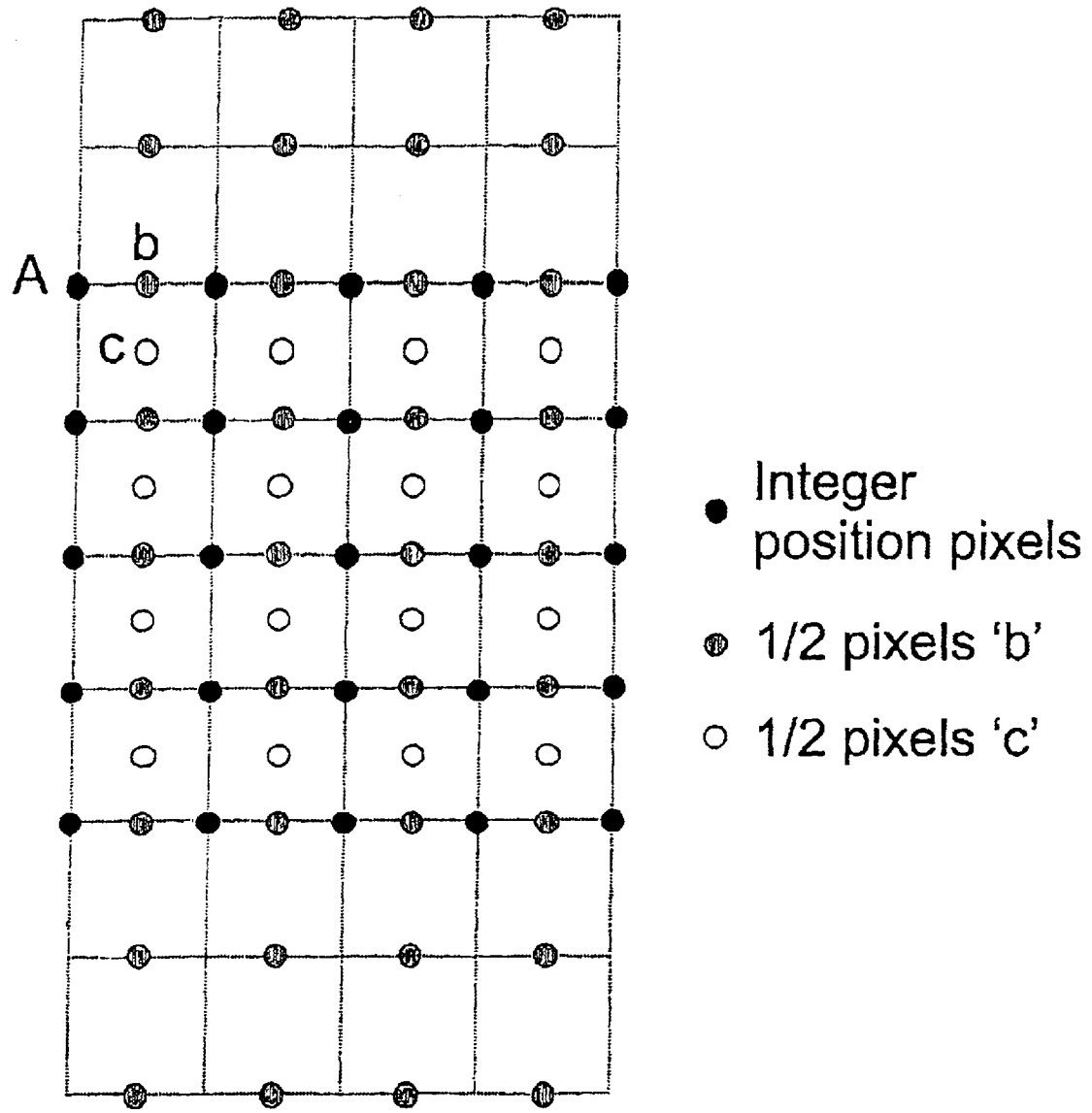
FIG. 16 shows the half resolution sub-pixel values required to calculate other half resolution sub-pixel values.

In the following, the complexity of the sub-pixel value interpolation method according to the invention, when applied in a video decoder, is compared with that of the interpolation schemes used in TML5 and TML6. Throughout the analysis which follows, it is assumed that in each method the interpolation of any sub-pixel value is performed using only the minimum number of steps required to obtain a correctly interpolated value. It is further assumed that each method is implemented in a block based manner, that is, intermediate values common for all the sub-pixels to be interpolated in a particular N×M block are calculated only once. An illustrative example is provided in FIG. 16. Referring to FIG. 16, it can be seen that in order to calculate a 4×4 block of ½ resolution sub-pixels c, a 9×4 block of ½ resolution sub-pixels b is first calculated.

Figure 17:
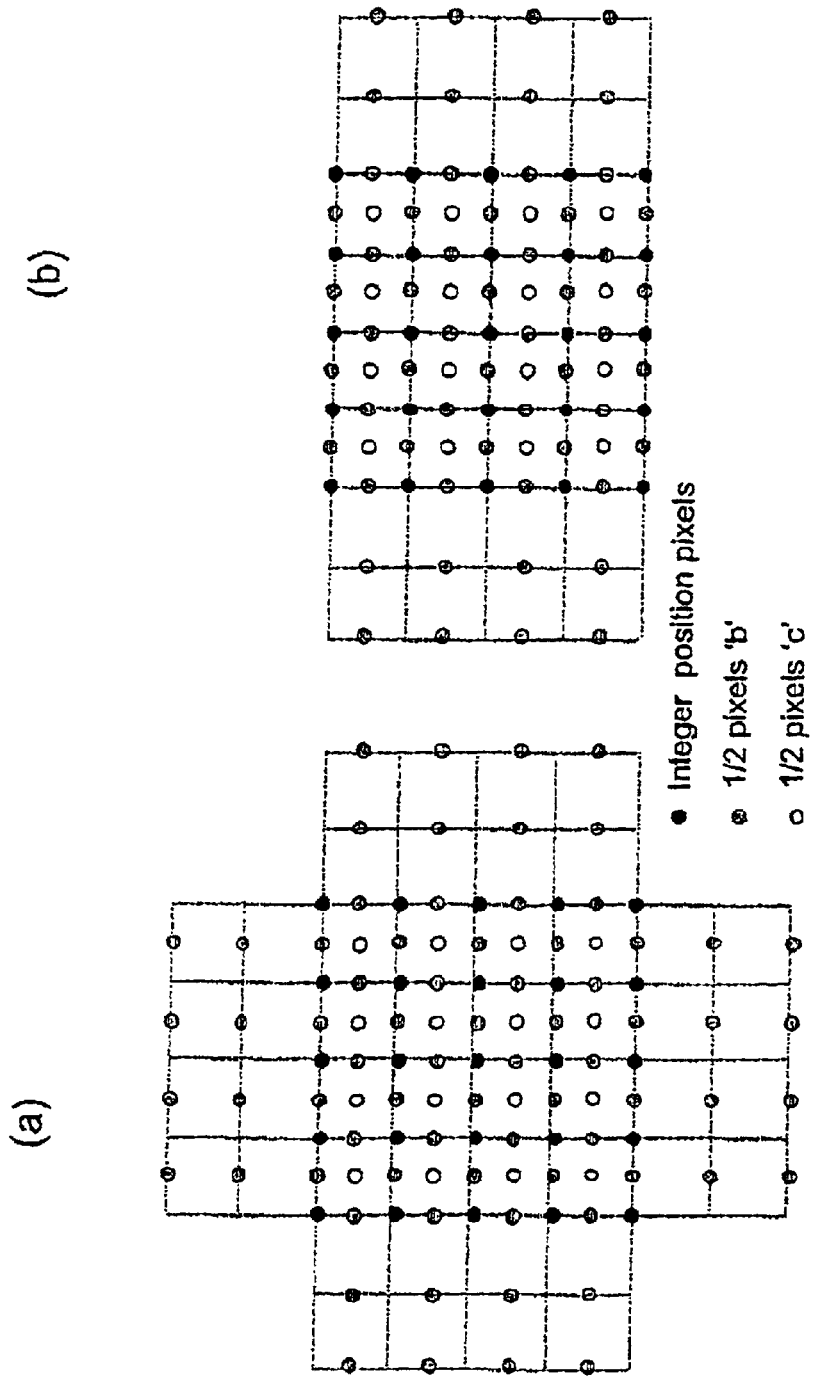
FIG. 17a shows the half resolution sub-pixel values that must be calculated in order to interpolate values for quarter resolution sub-pixels in an image block using the interpolation method of TML5.
FIG. 17b shows the half resolution sub-pixel values that must be calculated in order to interpolate values for quarter resolution sub-pixels in an image block using the interpolation method according to the invention.

Compared with the sub-pixel value interpolation method used in TML5, the method according to the invention has a lower computational complexity for the following reasons:

1. Unlike the sub-pixel value interpolation scheme used in TML5, according to the method of the invention, a value for ½ resolution sub-pixel c can be obtained by filtering in either the vertical or the horizontal direction. Thus, in order to reduce the number of operations, ½ resolution sub-pixel c can be interpolated in the vertical direction if a value for ¼ resolution sub-pixel f is required and in the horizontal direction if a value for ¼ resolution sub-pixel pixel g is required. As an example, FIG. 17 shows all the ½ resolution sub-pixel values that must be calculated in order to interpolate values for ¼ resolution sub-pixels g in an image block defined by 4×4 original image pixels using the interpolation method of TML5 (FIG. 17a) and using the method according to the invention (FIG. 17b). In this example, the sub-pixel value interpolation method according to TML5 requires a total of 88½ resolution sub-pixels to be interpolated, while the method according to the invention requires the calculation of 72½ resolution sub-pixels. As can be seen from FIG. 17b, according to the invention, ½ resolution sub-pixels c are interpolated in the horizontal direction in order to reduce the number of calculations required.

Figure 18:
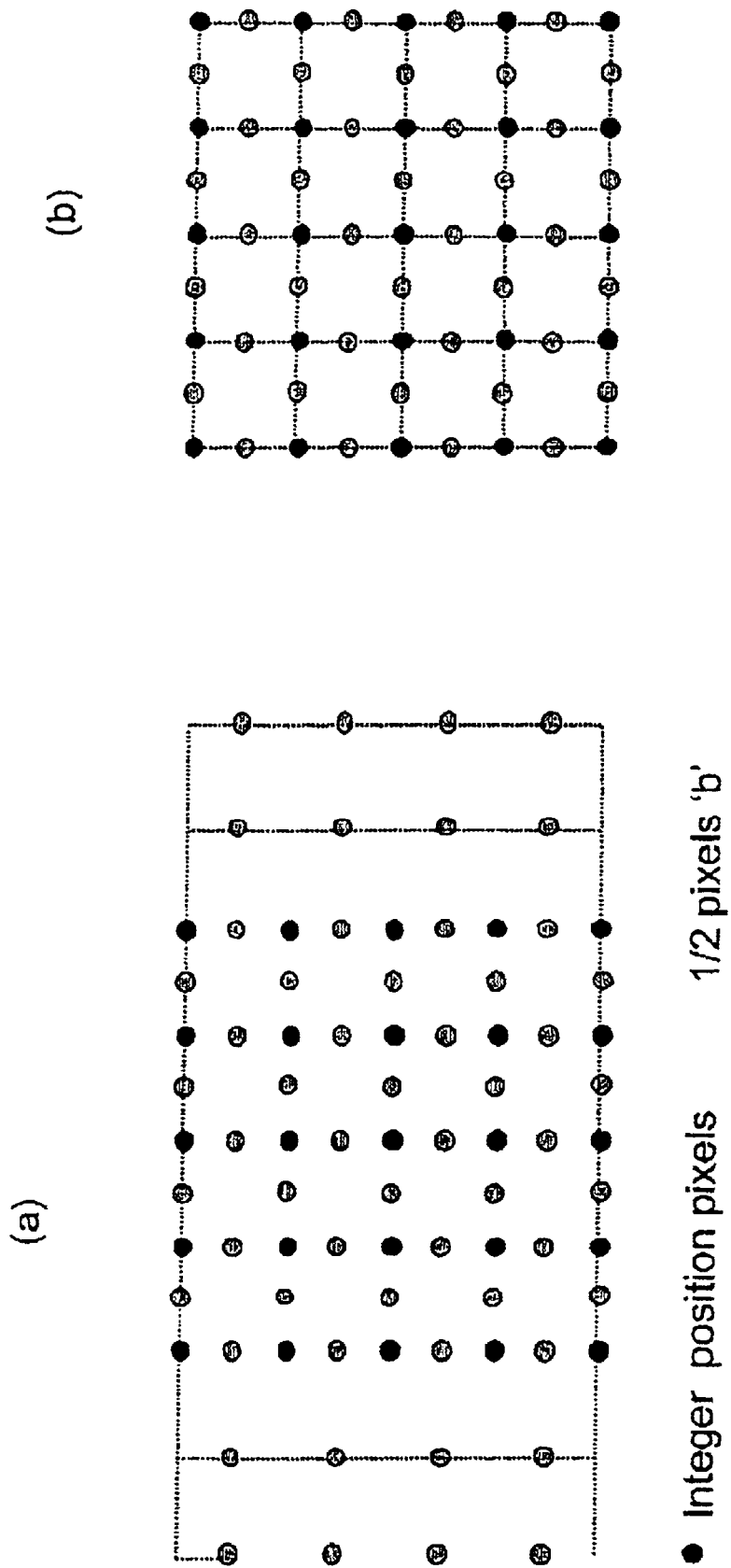
FIG. 18a shows the numbers of half resolution sub-pixels that must be calculated in order to obtain values for quarter resolution sub-pixels within an image block using the sub-pixel value interpolation method according to TML5.
FIG. 18b shows the numbers of half resolution sub-pixels that must be calculated in order to obtain values for quarter resolution sub-pixels within an image block using the sub-pixel value interpolation method according to the invention.

2. According to the method of the invention, ¼ resolution sub-pixel h is calculated by linear interpolation from its two closest neighbouring ½ resolution sub-pixels in the diagonal direction. The respective numbers of ½ resolution sub-pixels that must be calculated in order to obtain values for ¼ resolution sub-pixels h within a 4×4 block of original image pixels using the sub-pixel value interpolation method according to TML5 and the method according to the invention are shown in FIGS. 18(a) and 18(b), respectively. Using the method according to TML5 it is necessary to interpolate a total of 56½ resolution sub-pixels, while according to the method of the invention it is necessary to interpolate 40½ resolution sub-pixels.

Table 1 summarizes the decoder complexities of the three sub-pixel value interpolation methods considered here, that according to TML5, the direct interpolation method used in TML6 and the method according to the invention. Complexity is measured in terms of the number of 6-tap filtering and linear interpolation operations performed. It is assumed that Interpolation of ¼ resolution sub-pixel i is calculated according to $i=(A_1+A_2+A_3+A_4+2)/4$ which is bilinear interpolation and effectively comprises two linear interpolation operations. The operations needed to interpolate sub-pixel values with one 4×4 block of original image pixels are listed for each of the 15 sub-pixel positions which, for convenience of reference, are numbered according to the scheme shown in FIG. 19. Referring to FIG. 19, location 1 is the location of an original image pixel A and locations 2 to 16 are sub-pixel locations. Location 16 is the location of ¼ resolution sub-pixel i. In order to compute the average number of operations it has been assumed that the probability of a motion vector pointing to each sub-pixel position is the same. The average complexity is therefore the average of the 15 sums calculated for each sub-pixel location and the single full-pixel location.

TABLE 1

Complexity of ¼ resolution sub-pixel interpolation in TML5, TML6 and the method according to the invention.

| Location | TML5 linear. | TML5 6-tap | TML6 linear. | TML6 6-tap | Inventive Method linear. | Inventive Method 6-tap |
|---|---|---|---|---|---|---|
| 1 | 0 | 0 | 0 | 0 | 0 | 0 |
| 3, 9 | 0 | 16 | 0 | 16 | 0 | 16 |
| 2, 4, 5, 13 | 16 | 16 | 0 | 16 | 16 | 16 |
| 11 | 0 | 52 | 0 | 52 | 0 | 52 |
| 7, 15 | 16 | 52 | 0 | 52 | 16 | 52 |
| 10, 12 | 16 | 68 | 0 | 52 | 16 | 52 |
| 6, 8, 14 | 48 | 68 | 0 | 52 | 16 | 32 |
| 16 | 32 | 0 | 32 | 0 | 32 | 0 |
| Average | 19 | 37 | 2 | 32 | 13 | 28.25 |

It can be seen from Table 1 that the method according to the invention requires fewer 6-tap filter operations than the sub-pixel value interpolation method according to TML6 and only a few additional linear interpolation operations. Since 6-tap filter operations are much more complex than linear interpolation operations the complexity of the two methods is similar. The sub-pixel value interpolation method according to TML5 has a considerably higher complexity.

Figure 21:
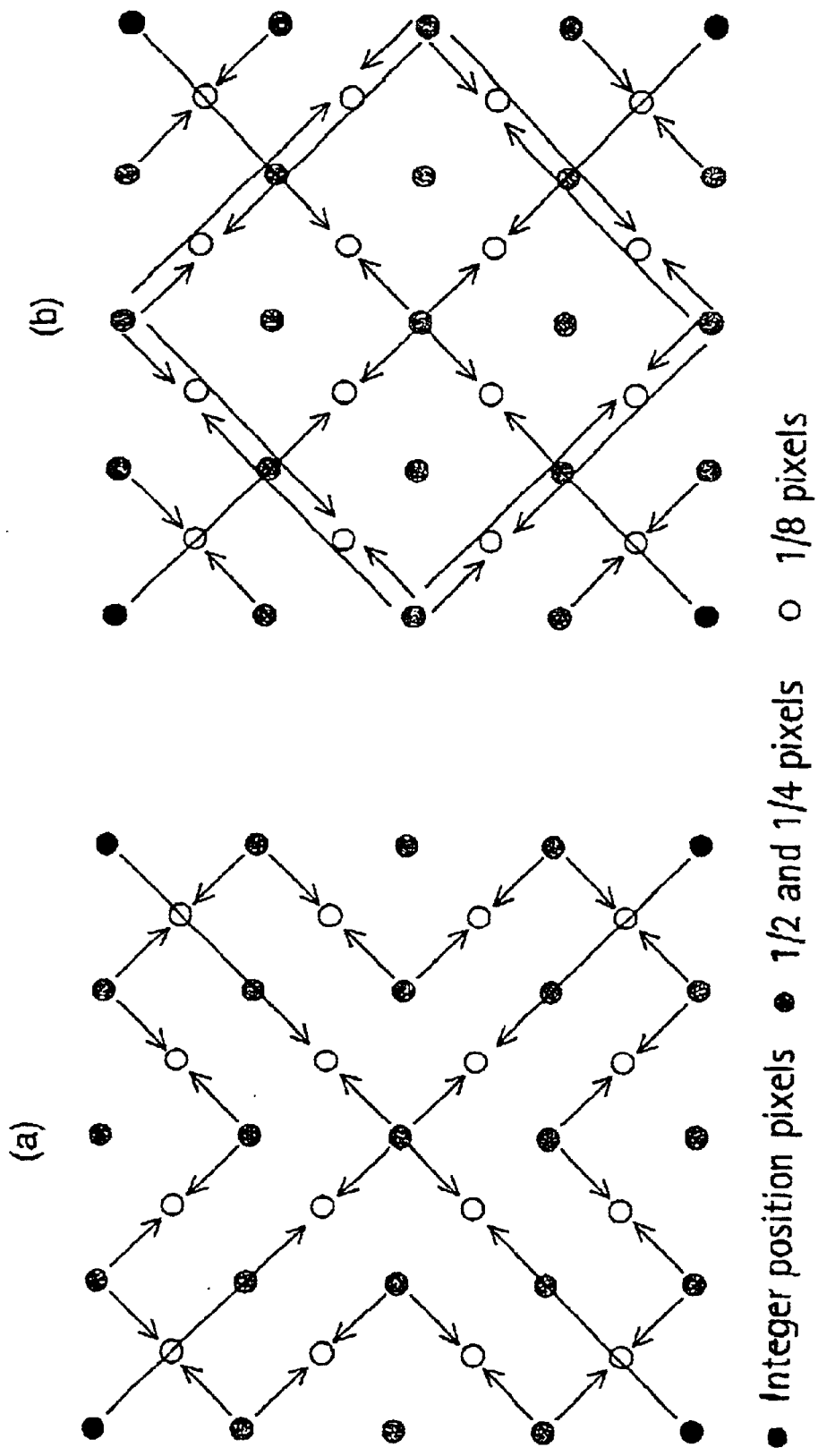
FIG. 21a shows the diagonal direction to be used in the interpolation of each eighth resolution sub-pixel in an embodiment of the invention.
FIG. 21b shows the diagonal direction to be used in the interpolation of each eighth resolution sub-pixel in another embodiment of the invention.

The preferred embodiment for interpolating sub-pixels with up to ⅛ pixel resolution will now be described with reference to FIGS. 20, 21 and 22.

FIG. 20 presents the nomenclature used to describe pixels, ½ resolution sub-pixels, ¼ resolution sub-pixels and ⅛ resolution sub-pixels in this extended application of the method according to the invention.

1. Values for the ½ resolution and ¼ resolution sub-pixels labelled $b^1$, $b^2$ and $b^3$ in FIG. 20 are obtained by first calculating intermediate values $b^1=(-3A_1+12A_2-37A_3+229A_4+71A_5-21A_6+6A_7-A_8)$; $b^2=(-3A_1+12A_2-39A_3+158A_4+158A_5-39A_6+12A_7-3A_8)$; and $b^3=(-A_1+6A_2-21A_3+71A_4+229A_5-37A_6+13A_7-3A_8)$ using the values of the eight nearest image pixels ($A_1$ to $A_8$) situated at unit horizontal and unit vertical locations in either the row or the column containing $b^1$, $b^2$ and $b^3$ and disposed symmetrically about ½ resolution sub-pixel $b^2$. The asymmetries in the filter coefficients used to obtain intermediate values $b^1$ and $b^3$ account for the fact that pixels $A_1$ to $A_8$ are not symmetrically located with respect to ¼ resolution sub-pixels $b^1$ and $b^3$. Final values for sub-pixels $b^i$, i=1, 2, 3 are calculated according to $b^i=(b^i+128)/256$ where the operator / denotes division with truncation. The result is clipped to lie in the range [0, 255].

2. Values for the ½ resolution and ¼ resolution sub-pixels labelled $c^{ij}$, i, j=1, 2, 3, are calculated according to $c^{1j}=(-3b_1^j+12b_2^j-37b_3^j+229b_4^j+71b_5^j-21b_6^j+6b_7^j-b_8^j+32768)/65536$, $c^{2j}=(-3b_1^j+12b_2^j-39b_3^j+158b_4^j+158b_5^j-39b_6^j+12b_7^j-3b_8^j+32768)/65536$ and $c^{3j}=(-b_1^j+6b_2^j-21b_3^j+71b_4^j+229b_5^j-37b_6^j+13b_7^j-3b_8^j+32768)/65536$ using the intermediate values $b^1$, $b^2$ and $b^3$ calculated for the eight closest sub-pixels ($b_1^j$ to $b_8^j$) in the vertical direction, sub-pixels $b^j$ being situated in the column comprising the ½ resolution and ¼ resolution sub-pixels $c^{ij}$ being interpolated and disposed symmetrically about the ½ resolution sub-pixel $c^{2j}$. The asymmetries in the filter coefficients used to obtain values for sub-pixels $c^{1j}$ and $c^{3j}$ account for the fact that sub-pixels $b_1^j$ to $b_8^j$ are not symmetrically located with respect to ¼ resolution sub-pixels $c^{1j}$ and $c^{3j}$. Once more, operator / denotes division with truncation. Before the interpolated values for sub-pixels $c^{ij}$ are stored in the frame memory they are clipped to lie in the range [0, 255]. In an alternative embodiment of the invention, ½ resolution and ¼ resolution sub-pixels $c^{ij}$ are calculated using in an analogous manner using intermediate values $b^1$, $b^2$ and $b^3$ in the horizontal direction.

3. Values for ⅛ resolution sub-pixels labelled d are calculated using linear interpolation from the values of their closest neighbouring image pixel, ½ resolution or ¼ resolution sub-pixels in the horizontal or vertical direction. For example, upper leftmost ⅛ resolution sub-pixel d is calculated according to $d=(A+b^1+1)/2$. As before, operator / indicates division with truncation.

4. Values for ⅛ resolution sub-pixels labelled e and f are calculated using linear interpolation from the values of image pixels, ½ resolution or ¼ resolution sub-pixels in the diagonal direction. For example, referring to FIG. 20, upper leftmost pixel ⅛ resolution sub-pixel e is calculated according to $e=(b^1+b^1+1)/2$. The diagonal direction to be used in the interpolation of each ⅛ resolution sub-pixel in a first preferred embodiment of the invention, hereinafter referred to as 'preferred method 1', is indicated in FIG.

21(a). Values for ⅛ resolution sub-pixels labelled g are calculated according to g=(A+3c$^{22}$+3)/4. As always, operator / denotes division with truncation. In an alternative embodiment of the invention, hereinafter referred to as 'preferred method 2', computational complexity is further reduced by interpolating ⅛ resolution sub-pixels f using linear interpolation from ½ resolution sub-pixels b$^2$, that is, according to the relationship f=(3b$^2$+b$^2$+2)/4. The b$^2$ sub-pixel which is closer to f is multiplied by 3. The diagonal interpolation scheme used in this alternative embodiment of the invention is depicted in FIG. 21(b). In further alternative embodiments, different diagonal interpolation schemes can be envisaged.

It should be noted that in all cases where an average involving pixel and/or sub-pixel values is used in the determination of ⅛ resolution sub-pixels, the average may be formed in any appropriate manner. The addition of 1 to the sum of values used in calculating such an average has the effect of causing any rounding or truncation operation subsequently applied to round or truncate the average in question to the next highest integer value. In alternative embodiments of the invention, the addition of 1 is not used.

As in the case of sub-pixel value interpolation to ¼ pixel resolution previously described, memory requirements in the encoder can be reduced by pre-calculating only a part of the sub-pixel values to be interpolated. In the case of sub-pixel value interpolation to ⅛ pixel resolution, it is advantageous to calculate all ½ resolution and ¼ resolution sub-pixels before-hand and to compute values for ⅛ resolution sub-pixels in an on-demand fashion, only when they are required. When this approach is taken, both the interpolation method according to TML5 and that according to the invention require 16 times the original picture memory to store the ½ resolution and ¼ resolution sub-pixel values. However, if the direct interpolation method according to TML6 is used in the same way, intermediate values for the ½ resolution and ¼ pixel resolution sub-pixels must be stored. These intermediate values are represented with 32-bit precision and this results in a memory requirement 64 times that for the original, non-interpolated image.

In the following, the complexity of the sub-pixel value interpolation method according to the invention, when applied in a video decoder to calculate values for sub-pixels at up to ⅛ pixel resolution, is compared with that of the interpolation schemes used in TML5 and TML6. As in the equivalent analysis for ¼ pixel resolution sub-pixel value interpolation described above, it is assumed that in each method the interpolation of any sub-pixel value is performed using only the minimum number of steps required to obtain a correctly interpolated value. It is also assumed that each method is implemented in a block based manner, such that intermediate values common for all the sub-pixels to be interpolated in a particular N×M block are calculated only once.

Table 2 summarizes complexities of the three interpolation methods. Complexity is measured in terms of the number of 8-tap filter and linear interpolation operations performed in each method. The table presents the number of operations required to interpolate each of the 63 ⅛ resolution sub-pixels within one 4×4 block of original image pixels, each sub-pixel location being identified with a corresponding number, as illustrated in FIG. 22. In FIG. 22, location 1 is the location of an original image pixel and locations 2 to 64 are sub-pixel locations. When computing the average number of operations, it has been assumed that the probability of a motion vector pointing to each sub-pixel position is the same. The average complexity is thus the average of the 63 sums calculated for each sub-pixel location and the single full-pixel location.

TABLE 2

Complexity of ⅛ resolution sub-pixel interpolation in TML5, TML6 and the method according to the invention. (Results shown separately for Preferred Method 1 and Preferred Method 2).

| Location | TML5 linear. | TML5 8-tap | TML6 linear. | TML6 8-tap | Preferred Method 1 linera. | Preferred Method 1 8-tap | Preferred Method 2 linear. | Preferred Method 2 8-tap |
|---|---|---|---|---|---|---|---|---|
| 1 | 0 | 0 | 0 | 0 | 0 | 0 | 0 | 0 |
| 3, 5, 7, 17, 33, 49 | 0 | 16 | 0 | 16 | 0 | 16 | 0 | 16 |
| 19, 21, 23, 35, 37, 39, 51, 53, 55 | 0 | 60 | 0 | 60 | 0 | 60 | 0 | 60 |
| 2, 8, 9, 57 | 16 | 16 | 0 | 16 | 16 | 16 | 16 | 16 |
| 4, 6, 25, 41 | 16 | 32 | 0 | 16 | 16 | 32 | 16 | 32 |
| 10, 16, 58, 64 | 32 | 76 | 0 | 60 | 16 | 32 | 16 | 32 |
| 11, 13, 15, 59, 61, 63 | 16 | 60 | 0 | 60 | 16 | 60 | 16 | 60 |
| 18, 24, 34, 40, 50, 56 | 16 | 76 | 0 | 60 | 16 | 60 | 16 | 60 |
| 12, 14, 60, 62 | 32 | 120 | 0 | 60 | 16 | 32 | 16 | 32 |
| 26, 32, 42, 48 | 32 | 108 | 0 | 60 | 16 | 32 | 16 | 32 |
| 20, 22, 36, 38, 52, 54 | 16 | 120 | 0 | 60 | 16 | 76 | 16 | 76 |
| 27, 29, 31, 43, 45, 47 | 16 | 76 | 0 | 60 | 16 | 76 | 16 | 76 |
| 28, 30, 44, 46 | 32 | 152 | 0 | 60 | 16 | 60 | 16 | 60 |
| Average | 64 | 290.25 | 0 | 197.75 | 48 | 214.75 | 48 | 192.75 |

As can be seen from Table 2, the number of 8-tap filtering operations performed according to preferred methods 1 and 2 are, respectively, 26% and 34% lower than the number of 8-tap filtering operation performed in the sub-pixel value interpolation method of TML5. The number of linear operations is 25% lower, in both preferred method 1 and preferred method 2, compared with TML5, but this improvement is of lesser importance compared to the reduction in 8-tap filtering operations. It can further be seen that the direct interpolation method used in TML6 has a complexity comparable that of both preferred methods 1 and 2 when used to interpolate values for ⅛ resolution sub-pixels.

In view of the foregoing description it will be evident to a person skilled in the art that various modifications may be made within the scope of the invention. While a number of preferred embodiments of the invention have been described in detail, it should be apparent that many modifications and variations thereto are possible, all of which fall within the true spirit and scope of the invention.

What is claimed is:

1. A method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the fractional horizontal and vertical locations being defined according to $\frac{1}{2}^x$, where x is a positive integer having a maximum value N, the method comprising:

a) when values for sub-pixels at $\frac{1}{2}^{N-1}$ unit horizontal and unit vertical locations, and unit horizontal and $\frac{1}{2}^{N-1}$ unit vertical locations are required, interpolating such values directly using weighted sums of pixels residing at unit horizontal and unit vertical locations;

b) when values for sub-pixels at $\frac{1}{2}^{N-1}$ unit horizontal and $\frac{1}{2}^{N-1}$ unit vertical locations are required, interpolating such values directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) when a value for a sub-pixel situated at a $\frac{1}{2}^N$ unit horizontal and $\frac{1}{2}^N$ unit vertical location is required, interpolating such a value by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

2. A method according to claim 1 wherein a first and a second weight are used in the weighted average referred to in (c), the relative magnitudes of the weights being inversely proportional to the (straight-line diagonal) proximity of the first and the second sub-pixel or pixel to the sub-pixel at $\frac{1}{2}^N$ unit horizontal and $\frac{1}{2}^N$ vertical location.

3. A method according to claim 2, wherein in a situation where the first and the second sub-pixel or pixel are symmetrically located with respect to (equidistant from) the sub-pixel at $\frac{1}{2}^N$ unit horizontal and $\frac{1}{2}^N$ vertical location, the first and second weights have equal values.

4. A method according to claim 1 in which the first weighted sum of values for sub-pixels residing at $\frac{1}{2}^{N-1}$ unit horizontal and unit vertical locations in step b) is used when a sub-pixel at $\frac{1}{2}^{N-1}$ unit horizontal and $\frac{1}{2}^N$ unit vertical location is required.

5. A method according to claim 1 in which the second weighted sum of values for sub-pixels residing at unit horizontal and $\frac{1}{2}^{N-1}$ unit vertical locations in step b) is used when a sub-pixel at $\frac{1}{2}^N$ unit horizontal and $\frac{1}{2}^{N-1}$ unit vertical location is required.

6. A method according to claim 1 in which, when values for sub-pixels at $\frac{1}{2}^N$ unit horizontal and unit vertical locations, and $\frac{1}{2}^N$ horizontal and $\frac{1}{2}^{N-1}$ vertical locations are required, interpolating such values by taking the average of the values of a first pixel or sub-pixel located at a vertical location corresponding to that of the sub-pixel being calculated and unit horizontal location and a second pixel or sub-pixel located at a vertical location corresponding to that of the sub-pixel being calculated and $\frac{1}{2}^{N-1}$ unit horizontal location.

7. A method according to claim 1 in which, when values for sub-pixels at unit horizontal and $\frac{1}{2}^N$ unit vertical locations, and $\frac{1}{2}^{N-1}$ unit horizontal and $\frac{1}{2}^N$ unit vertical locations are required, interpolating such values by taking the average of the values of a first pixel or sub-pixel located at a horizontal location corresponding to that of the sub-pixel being calculated and unit vertical location and a second pixel or sub-pixel located at a horizontal location corresponding to that of the sub-pixel being calculated and $\frac{1}{2}^{N-1}$ unit vertical location.

8. A method according to claim 1 in which values for sub-pixels at $\frac{1}{2}^N$ unit horizontal and $\frac{1}{2}^N$ unit vertical locations are interpolated by taking the average of values of a pixel located at a unit horizontal and unit vertical location, and a sub-pixel located at a $\frac{1}{2}^{N-1}$ unit horizontal and $\frac{1}{2}^{N-1}$ unit vertical location.

9. A method according to claim 1 in which values for sub-pixels at $\frac{1}{2}^N$ unit horizontal and $\frac{1}{2}^N$ unit vertical locations are interpolated by taking the average of values of a sub-pixel located at a $\frac{1}{2}^{N-1}$ unit horizontal and unit vertical location, and a sub-pixel located at a unit horizontal and $\frac{1}{2}^{N-1}$ unit vertical location.

10. A method according to claim 1 in which values for half of the sub-pixels at $\frac{1}{2}^N$ unit horizontal and $\frac{1}{2}^N$ unit vertical locations are interpolated by taking the average of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and values for the other half of the sub-pixels at $\frac{1}{2}^N$ unit horizontal and $\frac{1}{2}^N$ unit vertical locations are interpolated by taking the average of a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

11. A method according to claim 10 in which values for sub-pixels at $\frac{1}{2}^N$ unit horizontal and $\frac{1}{2}^N$ unit vertical locations are alternately interpolated for one such sub-pixel by taking the average of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and values and for a neighbouring such sub-pixel by taking the average of a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

12. A method according to claim 11 in which the sub-pixels at $\frac{1}{2}^N$ unit horizontal and $\frac{1}{2}^N$ unit vertical locations are alternately interpolated in a horizontal direction.

13. A method according to claim 11 in which the sub-pixels at $\frac{1}{2}^N$ unit horizontal and $\frac{1}{2}^N$ unit vertical locations are alternately interpolated in a horizontal direction.

14. A method according to claim 1 in which when values for some sub-pixels at $\frac{1}{2}^N$ unit horizontal and $\frac{1}{2}^N$ unit vertical locations are required, such values are interpolated by taking the average of a plurality of nearest neighbouring pixels.

15. A method according to claim 1 in which N equals an integer selected from a list consisting of the values 2, 3, and 4.

16. A method according to claim 1 in which in at least one of step a) and step b) interpolating sub-pixel values directly using weighted sums involves the calculation of an intermediate value for the sub-pixel values having a dynamic range greater than the specified dynamic range.

47

17. A method according to claim 14 in which the intermediate value for a sub-pixel having $\frac{1}{2}^{N-1}$ sub-pixel resolution is used the calculation of a sub-pixel value having $\frac{1}{2}^{N}$ sub-pixel resolution.

18. A method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the method comprising:

a) when values for sub-pixels at half unit horizontal and unit vertical locations, and unit horizontal and half unit vertical locations are required, interpolating such values directly using weighted sums of pixels residing at unit horizontal and unit vertical locations;

b) when values for sub-pixels at half unit horizontal and half unit vertical locations are required, interpolating such values directly using a weighted sum of values for sub-pixels residing at half unit horizontal and unit vertical locations calculated according to step (a); and c) when values for sub-pixels at quarter unit horizontal and quarter unit vertical locations are required, interpolating such values by taking the average of at least one pair of a first pair of values of a sub-pixel located at a half unit horizontal and unit vertical location, and a sub-pixel located at a unit horizontal and half unit vertical location and a second pair of values of a pixel located at a unit horizontal and unit vertical location, and a sub-pixel located at a half unit horizontal and half unit vertical location.

19. A method of interpolation in video coding in which an image comprising pixels arranged in rows and columns and represented by values having a specified dynamic range, the pixels in the rows residing at unit horizontal locations and the pixels in the columns residing at unit vertical locations, is interpolated to generate values for sub-pixels at fractional horizontal and vertical locations, the fractional horizontal and vertical locations being defined according to $\frac{1}{2}^{x}$ where x is a positive integer having a maximum value N, the method comprising:

a) when values for sub-pixels at $\frac{1}{2}^{N-1}$ unit horizontal and unit vertical locations, and unit horizontal and $\frac{1}{2}^{N-1}$ unit vertical locations are required, interpolating such values directly using weighted sums of pixels residing at unit horizontal and unit vertical locations;

b) when a value for a sub-pixel at a sub-pixel horizontal and sub-pixel vertical location is required, interpolating such a value directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

20. A method according to claim 1 in which the sub-pixels used in the first weighted sum are sub-pixels residing at $\frac{1}{2}^{N-1}$ unit horizontal and unit vertical locations and the first weighted sum is used to interpolate a value for a sub-pixel at $\frac{1}{2}^{N-1}$ unit horizontal and $\frac{1}{2}^{N}$ unit vertical location.

21. A method according to claim 1 in which the sub-pixels used in the second weighted sum are sub-pixels residing at unit horizontal and $\frac{1}{2}^{N-1}$ unit vertical locations and the second weighted sum is used to interpolate a value for a sub-pixel at $\frac{1}{2}^{N}$ unit horizontal and $\frac{1}{2}^{N-1}$ unit vertical location.

22. A method according to claim 1 in which when values for sub-pixels at $\frac{1}{2}^{N}$ unit horizontal and $\frac{1}{2}^{N}$ unit vertical locations are required, they are interpolated by taking the average of at least one pair of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

23. A video coder for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^{x}$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^{N}$ unit horizontal and $\frac{1}{2}^{N}$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^{N}$ unit horizontal and $\frac{1}{2}^{N}$ vertical location.

24. A video coder according to claim 23, comprising a video encoder.

25. A video encoder according to claim 23, comprising a video decoder.

26. A codec comprising the video encoder of claim 24 or the video decoder of claim 25.

27. A communications terminal comprising a video coder for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $\frac{1}{2}^{x}$, where x is a positive integer having a maximum value N, the interpolator being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $½^{N-1}$ unit horizontal and unit vertical locations and a second weighted sum of values for sub-pixels residing at unit horizontal and $½^{N-1}$ unit vertical locations, the first and second weighted sums of values being calculated according to step (a); and c) interpolate a value for a sub-pixel situated at a $½^N$ unit horizontal and $½^N$ unit vertical location by taking a weighted average of the value of a first sub-pixel or pixel situated at a $½^{N-m}$ unit horizontal and $½^{N-n}$ unit vertical location and the value of a second sub-pixel or pixel located at a $½^{N-p}$ unit horizontal and $½^{N-q}$ unit vertical location, variables m, n, p and q taking integer values in the range 1 to N such that the first and second sub-pixels or pixels are located diagonally with respect to the sub-pixel at $½^N$ unit horizontal and $½^N$ vertical location.

28. A communications terminal according to claim 27 comprising a video encoder.

29. A communications terminal according to claim 27 comprising a video decoder.

30. A communications terminal according to claim 27 having a video codec comprising a video encoder and a video decoder.

31. A telecommunications system comprising a communications terminal and a network, the telecommunications network and the communications terminal being connected by a communications link over which coded video can be transmitted, the communications terminal comprising a video coder for coding for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $½^x$, where x is a positive integer having a maximum value N, the interpolator being adapted to:

a) interpolate values for sub-pixels at $½^{N-1}$ unit horizontal and unit vertical locations, and unit horizontal and $½^{N-1}$ unit vertical locations directly using weighted sums of pixels residing at unit horizontal and unit vertical locations;

b) interpolate values for sub-pixels at $½^{N-1}$ unit horizontal and $½^{N-1}$ unit vertical locations directly using a choice of a first weighted sum of values for sub-pixels residing at $½^{N-1}$ unit horizontal and unit vertical locations and a second weighted sum of values for sub-pixels residing at unit horizontal and $½^{N-1}$ unit vertical locations, the first and second weighted sums of values being calculated according to step (a); and c) interpolate a value for a sub-pixel situated at a $½^N$ unit horizontal and $½^N$ unit vertical location by taking a weighted average of the value of a first sub-pixel or pixel situated at a $½^{N-m}$ unit horizontal and $½^{N-n}$ unit vertical location and the value of a second sub-pixel or pixel located at a $½^{N-p}$ unit horizontal and $½^{N-q}$ unit vertical location, variables m, n, p and q taking integer values in the range 1 to N such that the first and second sub-pixels or pixels are located diagonally with respect to the sub-pixel at $½^N$ unit horizontal and $½^N$ vertical location.

32. A telecommunications system according to claim 31 which is a mobile telecommunications system comprising a mobile communications terminal and a wireless network, the connection between the mobile communications terminal and the wireless network being formed by a radio link.

33. A telecommunications system according to claim 31 in which the network enables the communications terminal to communicate with other communications terminals connected to the network over communications links between the other communications terminals and the network.

34. A telecommunications system comprising a communications terminal and a network, the telecommunications network and the communications terminal being connected by a communications link over which coded video can be transmitted, the network comprising a video coder for coding for coding an image comprising pixels arranged in rows and columns and represented by values having a specified dynamic range, the pixels in the rows residing at unit horizontal locations and the pixels in the columns residing at unit vertical locations, the video coder comprising an interpolator adapted to generate values for sub-pixels at fractional horizontal and vertical locations, the fractional horizontal and vertical locations being defined according to $½^x$, where x is a positive integer having a maximum value N, the interpolator being adapted to:

a) interpolate values for sub-pixels at $½^{N-1}$ unit horizontal and unit vertical locations, and unit horizontal and $½^{N-1}$ unit vertical locations directly using weighted sums of pixels residing at unit horizontal and unit vertical locations;

b) interpolate values for sub-pixels at $½^{N-1}$ unit horizontal and $½^{N-1}$ unit vertical locations directly using a choice of a first weighted sum of values for sub-pixels residing at $½^{N-1}$ unit horizontal and unit vertical locations and a second weighted sum of values for sub-pixels residing at unit horizontal and $½^{N-1}$ unit vertical locations, the first and second weighted sums of values being calculated according to step (a); and c) interpolate a value for a sub-pixel situated at a $½^N$ unit horizontal and $½^N$ unit vertical location by taking a weighted average of the value of a first sub-pixel or pixel situated at a $½^{N-m}$ unit horizontal and $½^{N-n}$ unit vertical location and the value of a second sub-pixel or pixel located at a $½^{N-p}$ unit horizontal and $½^{N-q}$ unit vertical location, variables m, n, p and q taking integer values in the range 1 to N such that the first and second sub-pixels or pixels are located diagonally with respect to the sub-pixel at $½^N$ unit horizontal and $½^N$ vertical location.

35. A video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:

a) interpolate values for sub-pixels at $½^{N-1}$ unit horizontal and unit vertical locations, and unit horizontal and $½^{N-1}$ unit vertical locations directly using weighted sums of pixels residing at unit horizontal and unit vertical locations;

b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

36. A video coder according to claim 35 in which the interpolator is further adapted to form the first weighted sum using the values of sub-pixels residing at $\frac{1}{2}^{N-1}$ unit horizontal and unit vertical locations and to use the first weighted sum to interpolate a value for a sub-pixel at $\frac{1}{2}^{N-1}$ unit horizontal and $\frac{1}{2}^{N}$ unit vertical location.

37. A video coder according to claim 35 in which the interpolator is further adapted to form the second weighted sum using the values of sub-pixels residing at unit horizontal and $\frac{1}{2}^{N-1}$ unit vertical locations and to use the second weighted sum to interpolate a value for a sub-pixel at $\frac{1}{2}^{N}$ unit horizontal and $\frac{1}{2}^{N-1}$ unit vertical location.

38. A video coder according to claim 35 in which the interpolator is further adapted to interpolate values for sub-pixels at $\frac{1}{2}^{N}$ unit horizontal and $\frac{1}{2}^{N}$ unit vertical locations by taking the average of at least one pair of a first pair of values of a sub-pixel located at a $\frac{1}{2}^{N-1}$ unit horizontal and unit vertical location, and a sub-pixel located at a unit horizontal and $\frac{1}{2}^{N-1}$ unit vertical location and a second pair of values of a pixel located at a unit horizontal and unit vertical location, and a sub-pixel located at a $\frac{1}{2}^{N-1}$ unit horizontal and $\frac{1}{2}^{N-1}$ unit vertical location.

39. A video coder according to claim 35, comprising a video encoder.

40. A video encoder according to claim 35, comprising a video decoder.

41. A codec comprising the video encoder of claim 39 or the video decoder of claim 40.

42. A communications terminal comprising a video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:
a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;
b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

43. A communications terminal according to claim 42 comprising a video encoder.

44. A communications terminal according to claim 42 comprising a video decoder.

45. A communications terminal according to claim 42 having a video codec comprising a video encoder and a video decoder.

46. A telecommunications system comprising a communications terminal and a network, the telecommunications network and the communications terminal being connected by a communications link over which coded video can be transmitted, the communications terminal comprising a video coder for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:
a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;
b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

47. A telecommunications system according to claim 46 which is a mobile telecommunications system comprising a mobile communications terminal and a wireless network, the connection between the mobile communications terminal and the wireless network being formed by a radio link.

48. A telecommunications system according to claim 46 in which the network enables the communications terminal to communicate with other communications terminals connected to the network over communications links between the other communications terminals and the network.

49. A telecommunications system comprising a communications terminal and a network, the telecommunications network and the communications terminal being connected by a communications link over which coded video can be transmitted, the network comprising a video coder for coding for coding an image comprising pixels arranged in rows and columns and represented by values having a specified dynamic range, the pixels in the rows residing at unit horizontal locations and the pixels in the columns residing at unit vertical locations, the coder comprising an interpolator adapted to generate values for sub-pixels at fractional horizontal and vertical locations, the resolution of the sub-pixels being determined by a positive integer N, the interpolator being adapted to:
a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;
b) interpolate a value for a sub-pixel at a sub-pixel horizontal and sub-pixel vertical location is required directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

50. A codec for coding an image comprising pixels arranged in rows and columns and represented by values having a specified dynamic range, the pixels in the rows residing at unit horizontal locations and the pixels in the columns residing at unit vertical locations, the codec comprising a video encoder and a video decoder, each of the video encoder and the video decoder comprising an interpolator adapted to generate values for sub-pixels at fractional horizontal and vertical locations, the fractional horizontal and vertical locations being defined according to $\frac{1}{2}^{x}$, where x is a positive integer having a maximum value N, the interpolator of the video encoder and the interpolator of the video decoder each being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate values for sub-pixels at $\frac{1}{2}^{N-1}$ unit horizontal and $\frac{1}{2}^{N-1}$ unit vertical locations directly using a choice of a first weighted sum of values for sub-pixels residing at $\frac{1}{2}^{N-1}$ unit horizontal and unit vertical locations and a second weighted sum of values for sub-pixels residing at unit horizontal and $\frac{1}{2}^{N-1}$ unit vertical locations, the first and second weighted sums of values being calculated according to step (a); and c) interpolate a value for a sub-pixel situated at a $\frac{1}{2}^N$ unit horizontal and $\frac{1}{2}^N$ unit vertical location by taking a weighted average of the value of a first sub-pixel or pixel situated at a $\frac{1}{2}^{N-m}$ unit horizontal and $\frac{1}{2}^{N-n}$ unit vertical location and the value of a second sub-pixel or pixel located at a $\frac{1}{2}^{N-p}$ unit horizontal and $\frac{1}{2}^{N-q}$ unit vertical location, variables m, n, p and q taking integer values in the range 1 to N such that the first and second sub-pixels or pixels are located diagonally with respect to the sub-pixel at $\frac{1}{2}^N$ unit horizontal and $\frac{1}{2}^N$ vertical location.

51. A codec for coding an image comprising pixels arranged in rows and columns and represented by values having a specified dynamic range, the pixels in the rows residing at unit horizontal locations and the pixels in the columns residing at unit vertical locations, the codec comprising a video encoder and a video decoder, each of the video encoder and the video decoder comprising an interpolator adapted to generate values for sub-pixels at fractional horizontal and vertical locations, the resolution of the sub-pixels being determined by a positive integer N, the interpolator of the video encoder and the interpolator of the video decoder each being adapted to:

a) interpolate values for sub-pixels at $\frac{1}{2}^{N-1}$ unit horizontal and unit vertical locations, and unit horizontal and $\frac{1}{2}^{N-1}$ unit vertical locations directly using weighted sums of pixels residing at unit horizontal and unit vertical locations;

b) interpolate a value for a sub-pixel at a sub-pixel horizontal and sub-pixel vertical location directly using a choice of a first weighted sum of values for sub-pixels located at a vertical location corresponding to that of the sub-pixel being calculated and a second weighted sum of values for sub-pixels located at a horizontal location corresponding to that of the sub-pixel being calculated.

* * * * *